United States Patent
Arnold

(10) Patent No.: US 10,542,222 B2
(45) Date of Patent: Jan. 21, 2020

(54) MULTIVIEW BODY CAMERA SYSTEM WITH ENVIRONMENTAL SENSORS AND ALERT FEATURES

(71) Applicant: Daniel Arnold, Severna Park, MD (US)

(72) Inventor: Daniel Arnold, Severna Park, MD (US)

(*) Notice: Subject to any disclaimer, the term of this patent is extended or adjusted under 35 U.S.C. 154(b) by 0 days.

(21) Appl. No.: 16/223,703

(22) Filed: Dec. 18, 2018

(65) Prior Publication Data

US 2019/0268550 A1 Aug. 29, 2019

Related U.S. Application Data

(63) Continuation-in-part of application No. 15/756,437, filed as application No. PCT/US2016/049788 on Aug. 31, 2016, now Pat. No. 10,257,434.

(Continued)

(51) Int. Cl.
| | |
|---|---|
| *H04N 5/00* | (2011.01) |
| *A41D 1/00* | (2018.01) |
| *H04N 5/247* | (2006.01) |
| *A41D 1/04* | (2006.01) |
| *G02B 27/01* | (2006.01) |

(Continued)

(52) U.S. Cl.
CPC ............ *H04N 5/247* (2013.01); *A41D 1/002* (2013.01); *A41D 1/04* (2013.01); *A42B 3/042* (2013.01); *G02B 27/0172* (2013.01); *H04N 5/2253* (2013.01); *G02B 2027/0138* (2013.01); *G02B 2027/0156* (2013.01)

(58) Field of Classification Search
CPC .......... H04N 5/247; A41D 1/002; A41D 1/04; A42B 3/046; A42B 3/042
USPC ......................................................... 348/36
See application file for complete search history.

(56) References Cited

U.S. PATENT DOCUMENTS

| 4,257,062 A | 3/1981 | Meredith |
| 5,864,481 A * | 1/1999 | Gross ...................... G06F 1/163 |
| | | 700/90 |

(Continued)

OTHER PUBLICATIONS

Savoy, V., "U.S. Army to Deploy Individual Gunshot Detector, Essentially a Radar for Bullets", Mar. 17, 2011. Retrieved from the internet on Nov. 1, 2016. URL: https://www.engadget.com/2011/03/17/us-army-to-deploy-individual-gunshot-detector-essentially-a-rad/.

*Primary Examiner* — Jeffery A Williams
(74) *Attorney, Agent, or Firm* — Duane Morris LLP

(57) ABSTRACT

A multiview body camera system with a vest, a helmet, shoulder pads, camera units providing video, directional microphones providing audio, sensors providing motion detection and other functions is described herein. A control module controls camera units, microphones, sensors and all other circuitry. A tamper-proof locking compartment containing elements of the body camera system is operable by a remote control signal transmitted from an authorized party or by a security code. The body camera system features voice command recognition, real time monitoring, recording, storing, remote reporting; alerts the wearer of impending threats, such as approaching cars, persons, objects or gunshots and may incorporate a visor that provides a panoramic view. The body camera integrates all components internally. Bullet resistant material is used in the construction of the vest and helmet. The device operates continuously, and the wearer cannot disrupt the operation without consequence. All recorded data is archived an internal memory.

6 Claims, 20 Drawing Sheets

Related U.S. Application Data

(60) Provisional application No. 62/688,650, filed on Jun. 22, 2018, provisional application No. 62/599,962, filed on Dec. 18, 2018, provisional application No. 62/212,129, filed on Aug. 31, 2015, provisional application No. 62/212,152, filed on Aug. 31, 2015.

(51) Int. Cl.
*H04N 5/225* (2006.01)
*A42B 3/04* (2006.01)

(56) References Cited

U.S. PATENT DOCUMENTS

| | | |
|---|---|---|
| 6,628,325 B1 | 9/2003 | Steinberg et al. |
| 2003/0133008 A1 | 7/2003 | Stephenson |
| 2008/0165047 A1 | 7/2008 | Fisher et al. |
| 2008/0316863 A1 | 12/2008 | Walley et al. |
| 2012/0038777 A1 | 2/2012 | Portnoy |
| 2012/0327194 A1 | 12/2012 | Shiratori et al. |
| 2014/0184384 A1 | 7/2014 | Zhu et al. |
| 2014/0362244 A1 | 12/2014 | Martin |
| 2015/0110277 A1 | 4/2015 | Pidgeon et al. |

\* cited by examiner

MULTIVIEW BODY CAMERA SYSTEM WITH ENVIRONMENTAL SENSORS AND ALERT FEATURES

The application is a continuation-in-part of U.S. application Ser. No. 15/756,437 filed on Feb. 28, 2018. The applicant claims the benefit of provisional applications U.S. Application No. 62/599,962 filed on Dec. 18, 2017 and U.S. Application No. 62/688,650 filed on Jun. 22, 2018. The entirety of each are hereby incorporated by reference.

FIELD OF DISCLOSURE

This disclosure relates to a detection and image recording system that includes cameras, acoustic and environmental sensors designed for mounting on an individual's body and is generally intended for use by public safety personnel, primarily police, but also has other applications including military, sporting and other uses such as for environmental inspections and assessments, providing an archival recording of events and greatly increasing situation awareness that increases the safety of the wearer.

DESCRIPTION OF RELATED ART

Conventional prior art body cameras often used by police forces typically involve affixing a single camera in a small enclosure that is externally attached to the apparel of the wearer. Also relevant to this invention are helmet mounted cameras that have been used by the military which affixes a single camera in a small enclosure that is externally attached to the helmet and in connection with extreme sports such as skydiving, skiing, surfing, biking, motor sports and other activities. These helmet and other body mounted devices are typically affixed to provide a view that generally corresponds to the field of vision of the wearer. These conventional devices typically capture a visual recording from the field of view of a single forward looking camera. Conventional devices are typically affixed externally to the wearers clothing and/or helmet and thereby subject to unintentional or deliberate removal. Many also incorporate an audio recording component.

These conventional cameras do not typically capture views of events that occur to the lateral sides or rear of the wearer. In addition, these conventional devices lack safety enhancing features that provide situational awareness reporting other than the audio and visual recording itself. For example, conventional body cameras lack proximity detection, gunshot detection and motion detection technology and corresponding feedback signals to alert the wearer of events that are detected beyond the camera's and the wearer's normal field of vision.

BRIEF SUMMARY OF THE DISCLOSURE

The present invention is directed to a camera system that captures and records events that occur in proximity to a user that includes multiple cameras oriented to capture multiple angles to therefore cover a more complete picture of the surrounding environment. Embodiments of the system also include audio recordings, motion detectors, proximity detectors, alert systems, geolocation recording, directional microphones used for gunshot detection, one or more system controllers, timing control, image acoustic and proximity processing hardware, firmware and software, remote control features, a solid state memory, signal transmitter and receiver elements, and encryption/decryption features. Embodiments of the system may transmit secure signals to and from the portable mounted camera and sensor elements of the system to and from a remote location including communications.

In a first embodiment a system is incorporated into a vest or garment that is designed to be worn over the torso. The device continuously detects motion around the wearer and also provides a video acoustic and proximity recording with a complete 360-degree range surrounding the wearer as well as above the wearer for a complete hemisphere of awareness. In an embodiment, a vest device incorporates a plurality of cameras that are oriented in different directions, including one or more forward facing cameras, one or more rearward facing camera and one or more lateral side facing cameras and one or more skyward facing cameras. In other vest embodiments, a fisheye lens is employed that provides a wide angle view. The fisheye lens may be a circular type or full-frame and can provide up to 180-degree diagonal angle of view. In yet other embodiments, in addition to forward and rearward facing cameras, shoulder mounted lateral cameras are also provided that are oriented to capture views on the respective sides of the wearer as well as skyward. In embodiments, the device further includes directional microphones and sensors such that a complete history of surrounding events may be preserved.

The elements of the vest mounted first embodiment are integrally embedded within the structure of the vest in order to reduce the chance of damage during physical activity. Alternately, the system can be incorporated into other garments including but not limited to jackets, coats and body armor. In an embodiment of the invention, the vest incorporates protective penetration resistant body armor material within the structure of the vest itself such as, but not limited to Kevlar in order to enhance the safety of the wearer.

In a further embodiment, the camera elements of the system are mounted on a protective helmet. The helmet may also house other elements of the system or be in communication with other elements of the system that are integrated into a vest or other garment.

The present invention provides both safety and a tactical advantage to the wearer by alerting and notifying the wearer of the proximity, rate of approach and direction of persons and or objects that are beyond their normal field of vision thus enabling a 360-degree field of awareness of the surrounding environment as it is occurring. In addition, in embodiments the wearer may be alerted to events occurring above the wearer thereby providing a complete hemispheric dome of awareness and location of and communication with other body camera wearers.

The system memorializes a robust, reliable and unalterable recording of video, audio, proximity, motion detection, gunshot location, GPS location enhanced with 3D orientation Data, and time as well as inputs from various sensors, having locking compartments for the data storage device, battery, the electronic control module and protection of all components of the device and of all recorded information. The system can also include a system to detect and report tampering.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
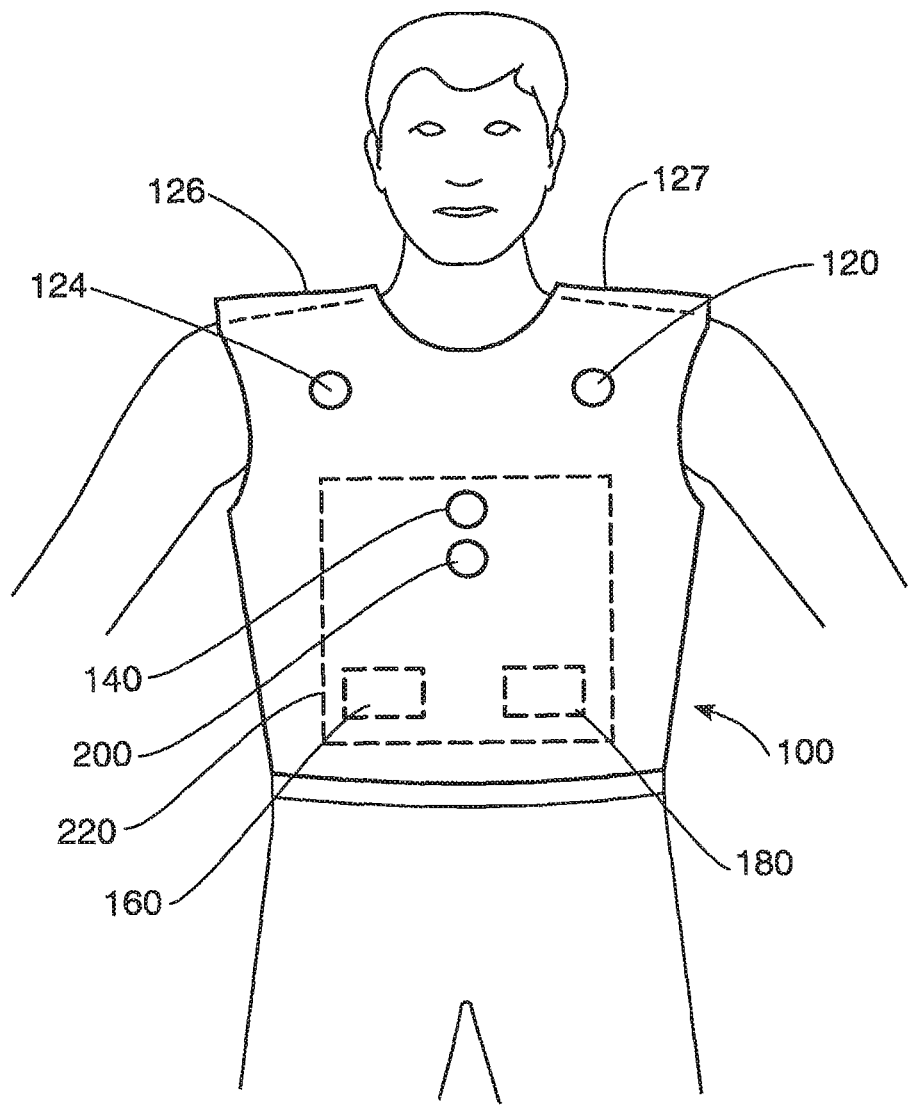
FIG. 1 is a front elevational view of a first embodiment consisting of a body camera vest, that illustrates an exemplary placement of components of the system, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations) and the spatially relative descriptors used herein may likewise be interpreted accordingly.

Now referring to FIG. 1, according to some embodiments, the system includes a front vest panel section 100 within which is mounted cameras 120 and 124. Also provided in the vest panel section is directional microphone 140, an electronic control module 160, a battery 180, environmental sensor 200, an insulating panel 220, a speaker/transducer (not shown). Vesper Technologies manufactures an advanced Directional Microphone using MEMS technology. An array of these devices will provide the Gunshot Direction and other audio related functions. The vest includes shoulder pad elements 126 and 127 that also are configured to receive cameras, directional microphones and environmental sensors. According to some embodiments, all of the cameras, directional microphones and sensing devices are provided in the shoulder pad element. The vest also includes a rear vest panel 128. Additional components, including a heat sink, venting, wiring, antennas, communications microphone, volume control are not shown.

FIG. 1 is a front view of a person wearing a body camera vest and depicts one of many possible embodiments and placements of many of the components of the system. According to some embodiments, the electronic control module 160 and the battery 180 are contained in locking compartment that can only be opened by a signal sent remotely by an authorized person via the archival storage and display system or by a security code. According to some embodiments, the vest uses two or more forward facing cameras 120 and 124 because the majority of activity occurs in the direction that the vest wearer is facing and one of the cameras may be obstructed at some times as well as to provide three dimensional viewing, motion detection and ranging. The body camera vest embodiment also provides safety and a tactical advantage to the wearer by alerting and notifying the wearer of the proximity, rate of approach and direction of persons and or objects that are beyond their normal field of view thus enabling a 360-degree field of awareness of the surrounding environment as it is occurring. Additionally, the wearer may be alerted to events from above, thereby providing a complete hemispherical dome of awareness.

Figure 2:
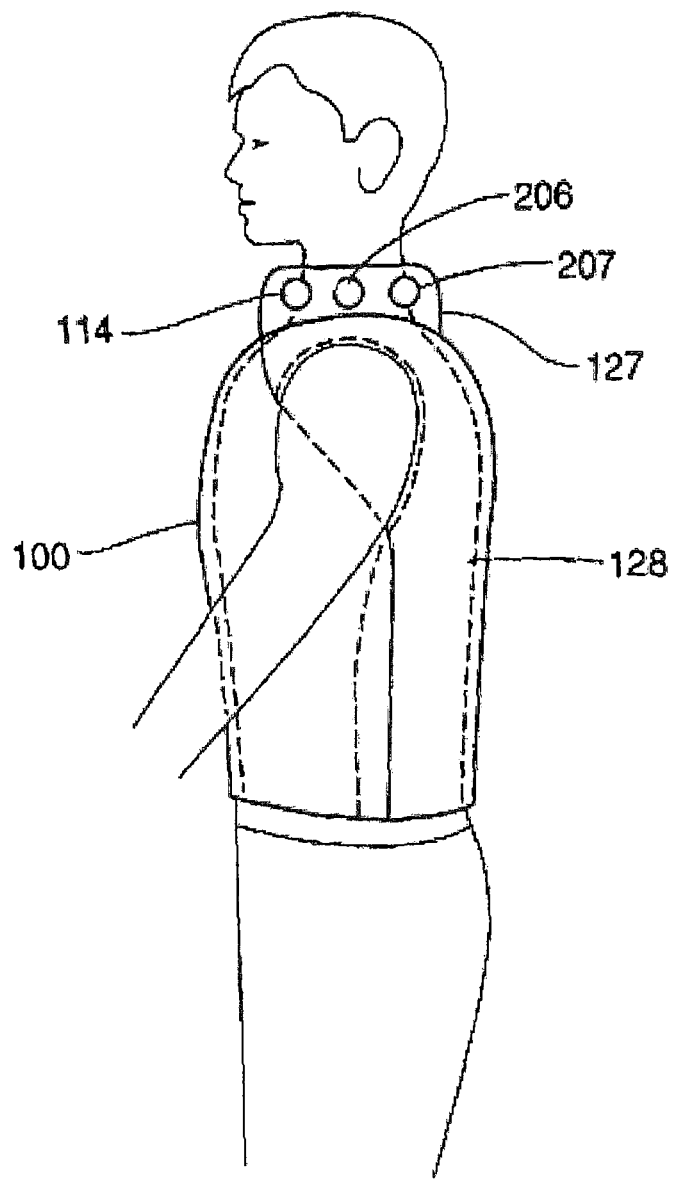
FIG. 2 is a side elevational view of the embodiment depicted in FIG. 1 including a view of the front and rear vest sections and a shoulder pad mounted portion, in accordance with some embodiments.

FIG. 2 is a side view of a person wearing the body camera vest and shows one of the possible embodiments including how front vest panel 100, rear vest panel 128 sections and the shoulder pad element 127 integrate together. The shoulder pad element 127 includes side oriented camera 206 and sensor 114 and directional microphone 207. According to some embodiments, the shoulder pads also include speakers, sensors and microphones including forward, backward, lateral and upward elements as well as all other components necessary to allow the shoulder pad element 127 to function independently.

Figure 3:
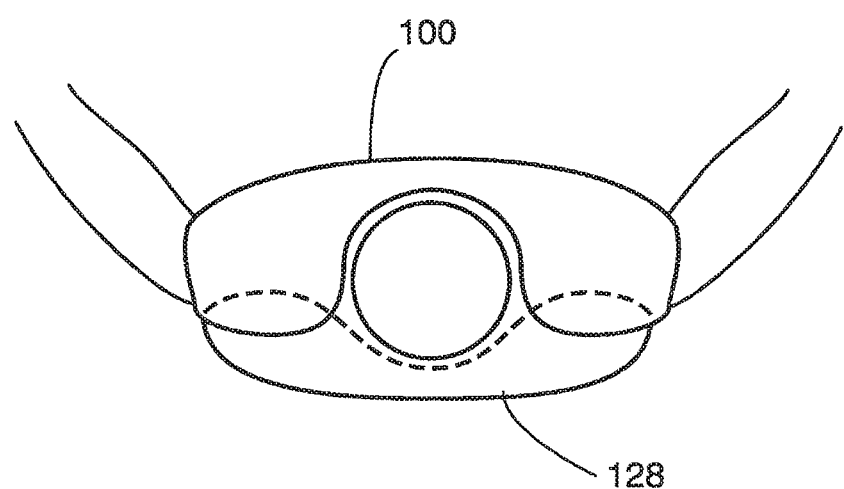
FIG. 3 is a top view of a person wearing the embodiment of FIG. 1, in accordance with some embodiments.

FIG. 3 is a top view of a person wearing the vest according to an embodiment, and also depicts an embodiment showing how the front element 100 and rear element 128 are integrated together. The vest is designed with adjustable overlapping panels such that one, or a very few sizes, will fit all wearers. Not shown are various methods available to secure the vest to the wearer, which may include straps, belts and or hook and loop fasteners.

Figure 4:
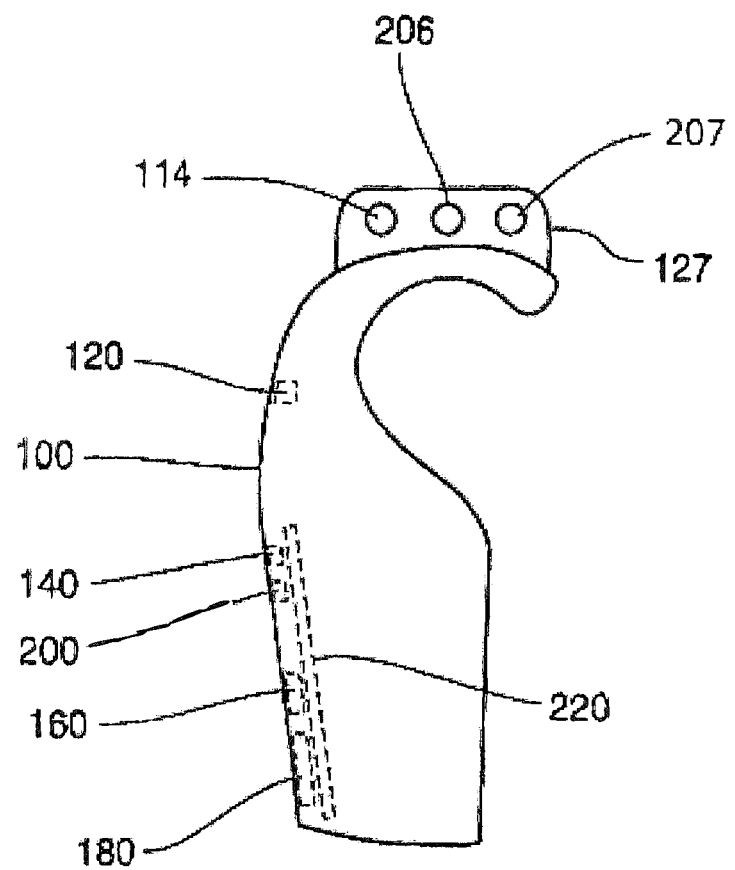
FIG. 4 is a side view of the front section of the vest embodiment depicting exemplary placements of many of the components of the system, in accordance with some embodiments.

FIG. 4 is a side view of the front vest panel 100 and the shoulder pad element 127 indicating one of many possible embodiments and placements of many of the components comprising the vest system denoted above. According to some embodiments, the shoulder system includes sensor 114, camera 206 and directional microphone 207, each of which face a lateral side of the person that is wearing the vest. The depicted arrangement also includes forward facing cameras 120 and 124, forward microphone 140 and forward proximity sensor 200 as shown in FIG. 1. Removable insulating panel 220 helps shield the wearer from heat generated by other circuit components when in place. The removal of panel 220 will aid in heat generation when desired. According to some embodiments, the electronic control module 160 and battery 180 are contained in tamper-proof locking compartment and access can be controlled by a signal sent by an authorized person from a remote control location or by manually entering a security code on a locking mechanism.

Figure 5A:
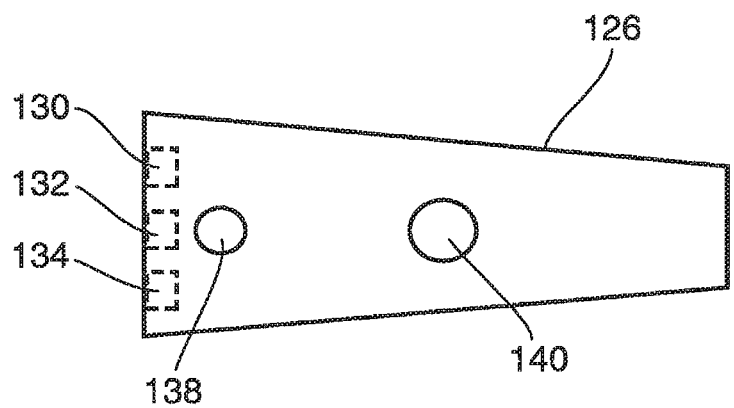
FIG. 5A is a top view of a shoulder mounted element of a vest according to an embodiment of the invention, in accordance with some embodiments.
Figure 5C:
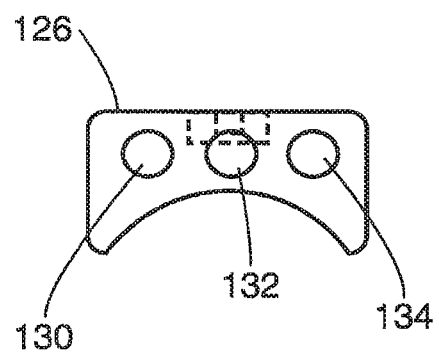
FIG. 5C is a side view in elevation of a shoulder pad mounted element according to an embodiment of the invention, in accordance with some embodiments.
Figure 5B:
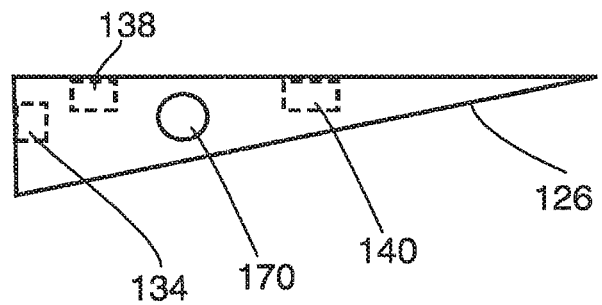
FIG. 5B is a front view in elevation of a shoulder pad mounted element according to an embodiment of the invention, in accordance with some embodiments.

Now referring to FIG. 5A, according to some embodiments, shoulder pad element 126 includes an upwardly oriented camera 138 incorporated into the shoulder pads 126 in order to look and report on what is above the wearer. The embodiment also includes laterals facing camera 132, directional microphone 134 and proximity environmental sensor 130. A further sensor 138 is provide on the top of the element. According to some embodiments, in FIG. 5C, shoulder pad 126 also has side oriented cameras 132, environmental sensor 130 and directional microphone 134. Referring to FIG. 5B, the shoulder pad element includes a forward facing camera 170. The video cameras 132, 138 and 170 are designed to capture and record continuous images of the environment. According to some embodiments, a camera, microphone and sensors are further provided that are-posited in a direction backward with respect to the wearer. Speaker/transducers (not shown) are also provided that point upward towards the wearer's ears from the shoulder pads). There is also a left and right side shoulder mounted version that is an alternate embodiment to the full vest when armor is either not required or is a separately worn item. By providing multiple cameras directional microphones and sensors in the shoulder pads multiple views of the environment can be captured. According to some embodiments, the entire body camera system, including power supply, processor and other described elements are provided within a shoulder pad element designed to be incorporated with conventional tactical vests or uniforms.

According to some embodiments, the cameras, the detection sensors and other elements of the system are mounted on a protective helmet that will continuously detect, record and report on a complete 360-degree range of events in the environment surrounding the wearer as they occur and skyward. According to some embodiments, this range is made possible by incorporating a plurality of cameras, directional microphones and sensors such that a complete time history of surrounding events is preserved.

According to some embodiments, the body camera helmet depicted in FIGS. 6 through 9 is a helmet mounted system containing a plurality of cameras, directional microphones and other sensors which are embedded within the structure of a helmet. The protective shell of the helmet serves to protect the wearer and significantly reduces the chances of the components from being damaged during physical activity because the elements are integrated within the structure rather than affixed externally to the helmet. According to some embodiments, elements of the invention are incorporated into or on other headgear, for example, but not limited to, a hat.

According to some embodiments, like the body camera vest embodiment discussed above, the body camera helmet embodiment also provides safety and a tactical advantage to the wearer by alerting and notifying the wearer of the proximity, rate of approach and direction of persons and or objects that are beyond their normal field of view thus enabling a 360-degree field of awareness of the surrounding environment as it is occurring. Additionally, the wearer may be alerted to events from above, thereby providing a complete hemispherical dome of awareness.

Referring now to FIGS. 6 through 9, the primary components of the helmet aspect of the invention include helmet shell 610, a plurality of cameras such as camera 612, directional microphones such as microphone 614, an electronic control module 619, a battery 618, environmental sensors 630, an insulating panel 622, speakers/transducer 624 and 625, communications microphone 627 and a helmet visor 626. The components are controlled by and incorporate conventional elements including such as, but not limited to, a heat sink, venting, wiring, control input switches, antennas, solar cells, volume control, connectors are not shown.

Figure 6:
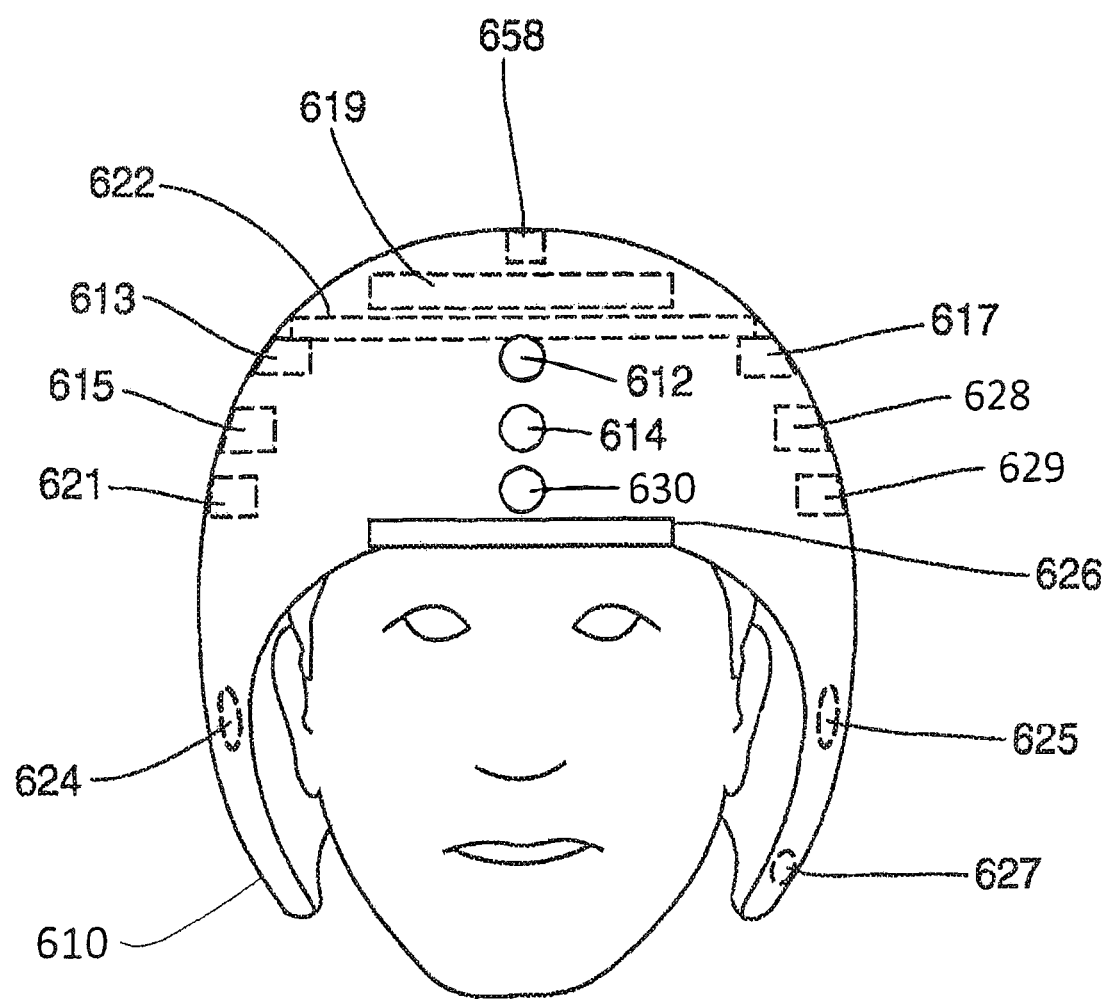
FIG. 6 is a front elevational view of an embodiment wherein components of the system of the invention are integrated with a helmet, in accordance with some embodiments.

FIG. 6 is a front view of a person wearing a helmet according to an embodiment of the invention indicating exemplary placements of many of the components in the system. According to some embodiments, an electronic control module 619 and battery 618 are contained in locking compartments and can accessed either by signal sent by an authorized person from a remote location or using a security code. While the embodiment of FIGS. 6 through 9 depict a single forward facing camera, in embodiments, the body camera helmet may use multiple cameras, or be used in combination with the body camera vest element discussed above. The use of multiple forward facing cameras is advantageous because the majority of relevant activity is likely to occurs in the direction that the wearer is facing, one of the cameras may be obstructed and it serves as a back-up in the event that a camera is damaged as well as provide three dimensional viewing and ranging. Both speakers/transducers 624 and 625 and microphone 627 are also integral to the helmet.

Figure 7:
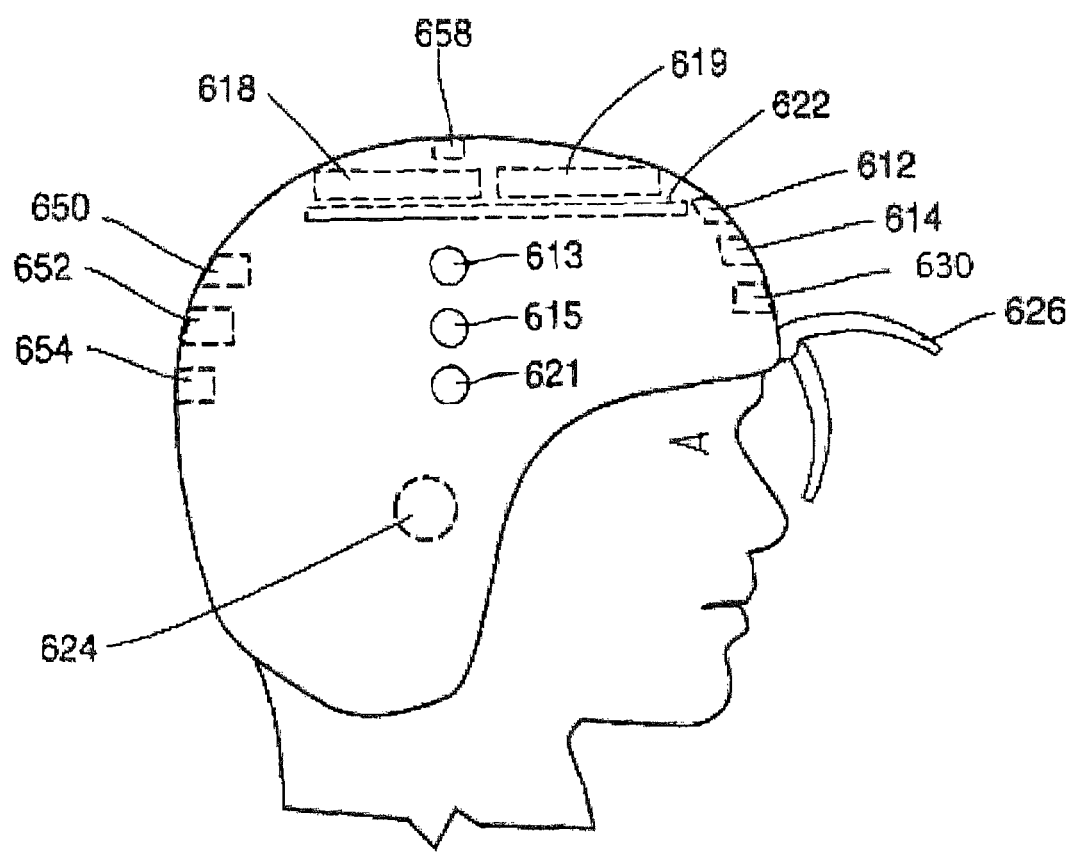
FIG. 7 is a side view in elevation of an embodiment wherein components of the system of the invention are integrated with a helmet, in accordance with some embodiments.

Now referring to FIG. 7, a side view of a person wearing an embodiment of a body camera helmet including the visual display screen of the visor 626, which is a transparent heads-up display that supplements the wearer's field of vision to enable a 360 degree cylindrical or hemispherical view is shown. According to some embodiments, the helmet visor 626 is made of a clear, partially opaque or coated shatter resistant material to protect the wearer and can pivot upward in order to be outside of the line of vision when warranted. Note that the speaker/transducers 624 and 625 are also integral to the helmet. The side view of the helmet depicts the lateral facing camera 613, lateral microphone 615 and lateral environmental sensor 621. The helmet includes a microphone 627 adapted to pick-up the voice of the user to facilitate communication with a remote command and control facility and or other body cameras for voice control of operations such as volume control, screen projection type, zoom and special service requests.

Figure 8:
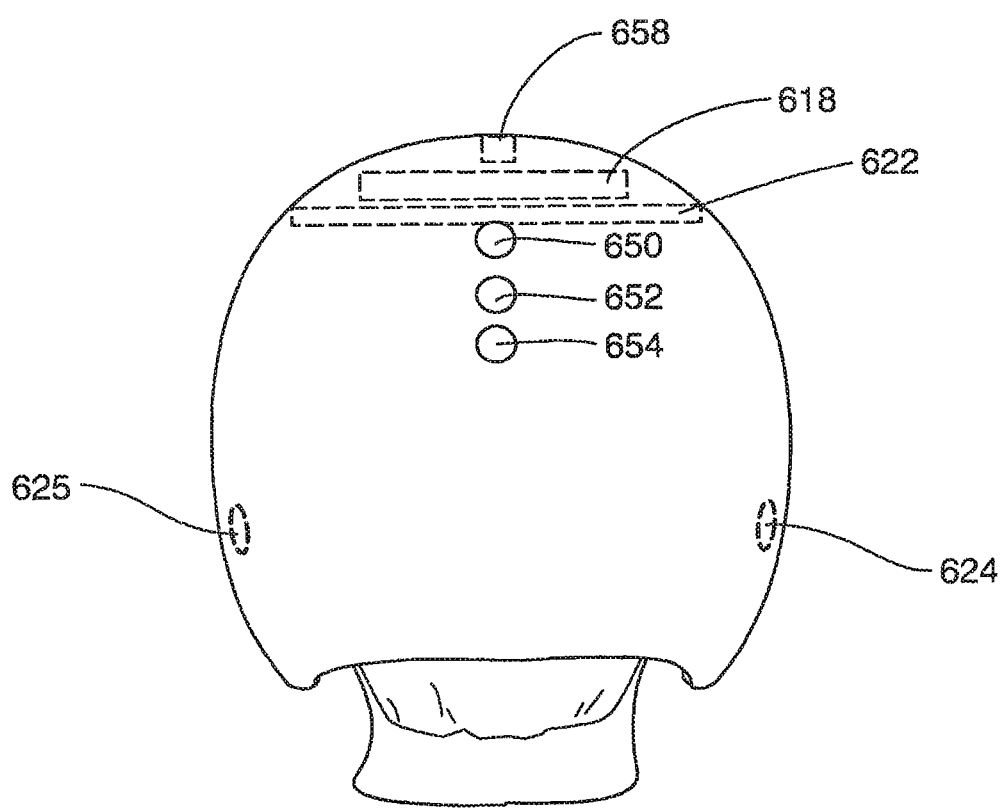
FIG. 8 is a rear view in elevation of a person wearing the body camera helmet depicting an embodiment reflecting a selected placement of the components of the system, in accordance with some embodiments.

FIG. 8 is a rear view of helmet 610 indicating one of many possible embodiments and placements of components of the system are integrated together. According to some embodiments, helmet 610 is shaped in such a manner to permit the electronic control module 619, battery 618 along with their surrounding locking compartments to be placed above the wearer's head. Helmet 610 is designed such that one, or a very few sizes, will fit all wearers. Facing rearward from helmet 610 are camera 650, directional microphone 652 and environmental sensor 654

Figure 9:
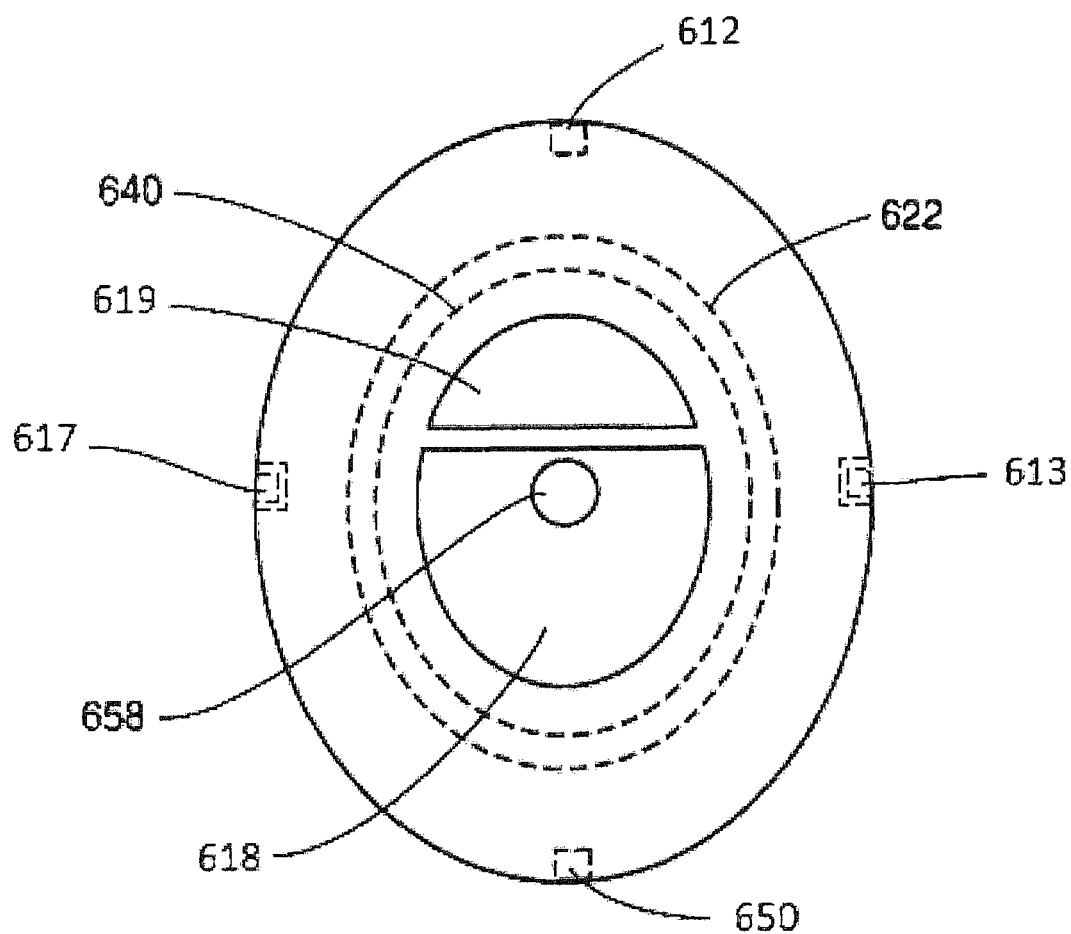
FIG. 9 is a top view of a person wearing the helmet embodiment of FIG. 6, in accordance with some embodiments.

According to some embodiments, FIG. 9 is a top view of the helmet embodiment depicting the location of removable insulating panel 622 that shields the wearer from heat generated by other circuit components when in place. The electronic control module 619 and battery 618 are contained in tamper proof locking compartment 640 and can be accessed by a signal sent by an authorized person via the archival storage and display or using a security code. This embodiment has an upwardly oriented camera 658.

Figure 10:
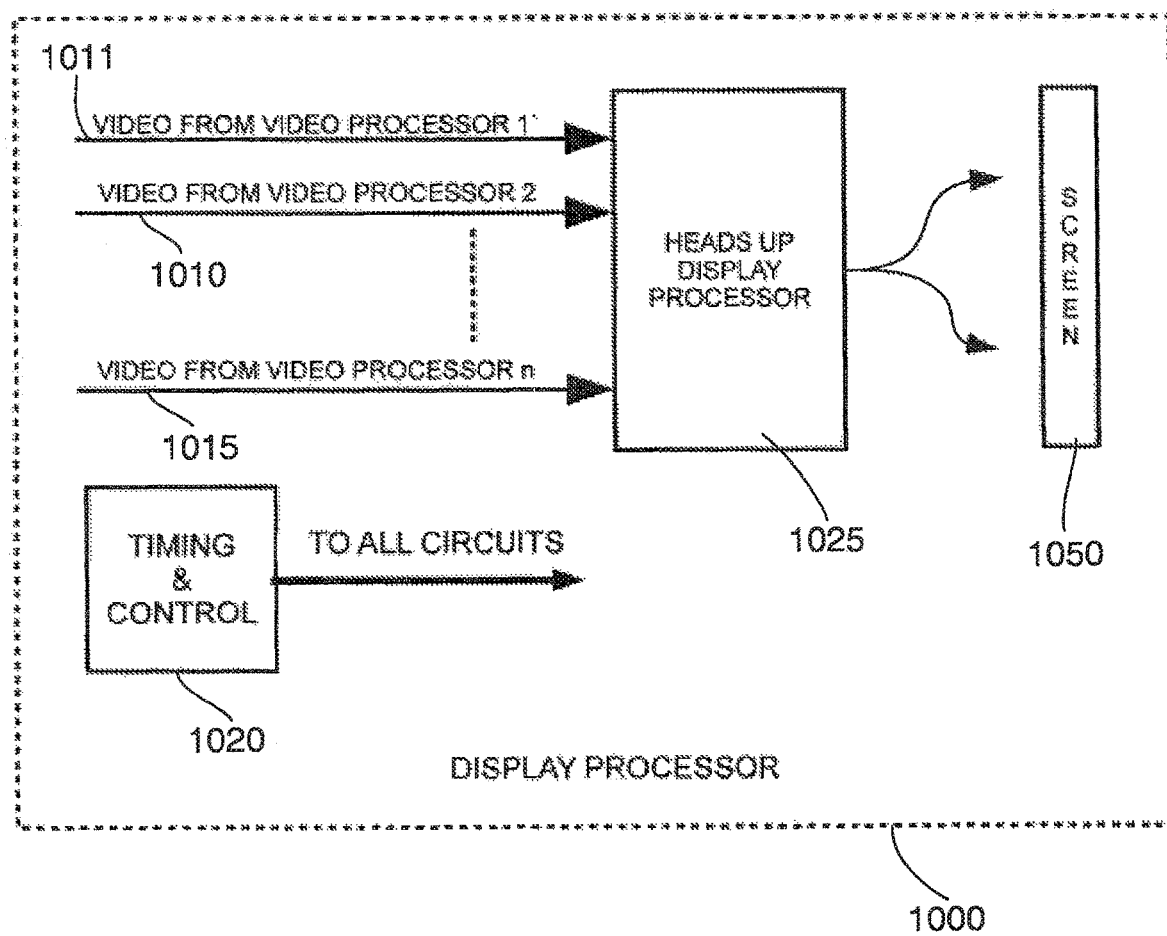
FIG. 10 is a block diagram of the display processor which converts video from a video processor into a visual display on the visor screen, in accordance with some embodiments.

FIG. 10 is a block diagram of the display processor 1000 which converts video from the video processor into a visual display on screen 1050 on visor 626, which is a transparent visual display that supplements the wearer's field of vision to enable a 360-degree view. According to some embodiments, helmet visor 626 is made of a clear or coated, shatter resistant material to protect the wearer which can pivot upward in order to be outside of the line of vision when warranted. According to some embodiments, the helmet visor itself may also be a video screen. The heads up display processor 1025 receives video from a plurality of video processors including 1011, 1010 and 1015 and projects the data to the screen 1050. The heads up display allows the wearer to view a wide range of views on the display without turning his or her head. It essentially allows the wearer to see the entire range of vision captured by the camera array. In embodiments, the heads up display processor can revive previously recorded data and receive data from the remote command and control location and which may include mapping data, suspect images and instructions for review in the field.

Figure 11A:
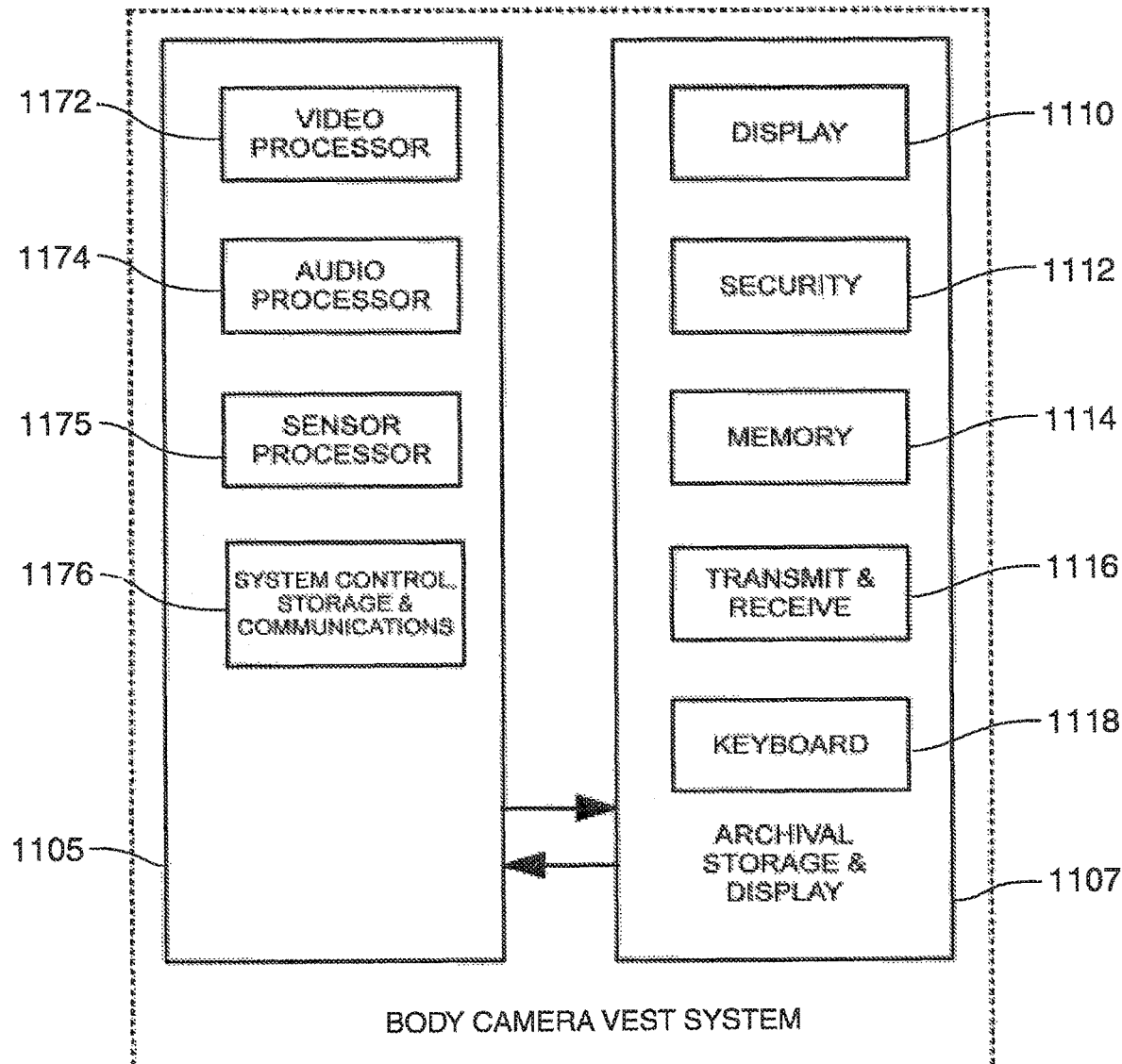
FIG. 11A is a block diagram of the body camera vest system illustrating the interface between the body camera vest and an archival storage and display system, in accordance with some embodiments.

FIG. 11A, a block diagram entitled "Body Camera Vest System" illustrates the components and interface between the body camera vest system 1105 and a remote archival storage and display system 1107. According to some embodiments, system 1107 includes display 1110, security function 1112, memory 1114, a transmission and receiving module 1116 and data entry device such as keyboard 1118, not shown is in some embodiments a microprocessor system that controls the archival storage and display system 1107. According to some embodiments, connection can be made via the corresponding wireless transmitters and receivers or by direct connection when the body camera vest 1105 is located in proximity to the archival storage and display system 1107. The body camera vest system includes video processor 1172, audio processor 1174, sensor processor 1175 and the system control, storage and communication module 1176. Security function refers to password protection as well as other security which may include encryption techniques as well as physical security means such as providing the system components within a restricted secure access area. The connection enables initialization, data transfer and termination of the recordings as well as real time and or playback monitoring. As well as tamper detection if, for example, the device is opened.

Figure 11B:
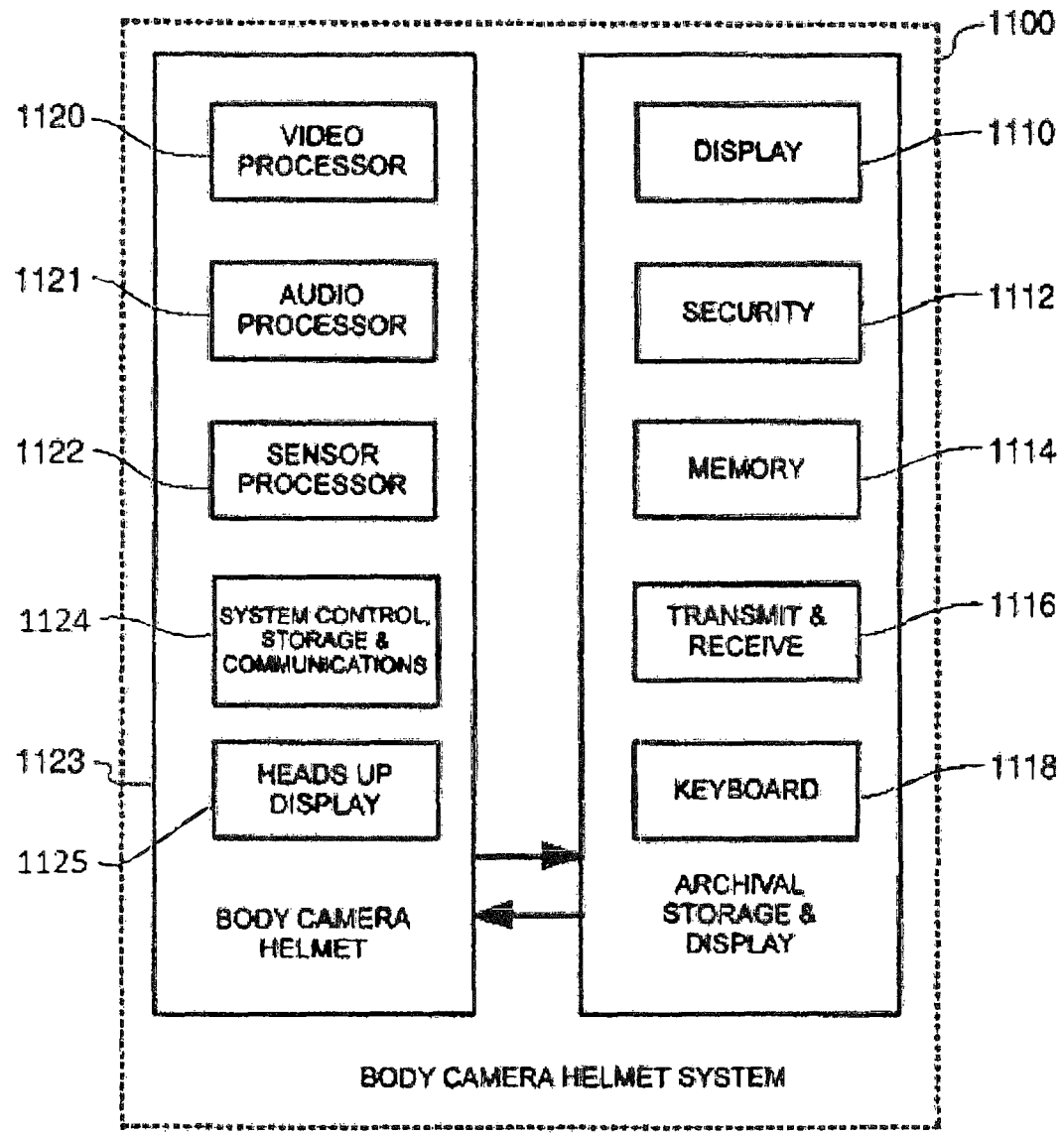
FIG. 11B is a block diagram of the body camera helmet system illustrating the interface between the body camera helmet and an archival storage and display system, in accordance with some embodiments.

FIG. 11B, a block diagram entitled "Body Camera Helmet System" illustrates the components and interface between the body camera helmet system 1123 and an archival storage and display system 1107. According to some embodiments, system 1107 includes display 1110, security function 1112, memory 1114, a transmission and receiving module 1116 and data entry device such as keyboard 1118, not shown is in some embodiments a microprocessor system that controls the archival storage and display system 1107. According to some embodiments, connection can be made via the corresponding wireless transmitters and receivers or by direct connection when the body camera helmet system 1123 is located in proximity to the archival storage and display system 1107, which is typically located at a command and control location. The archival storage and display elements are identical to that depicted in FIG. 11A and include a display 1110, security function 1112, memory 1114, a transmit and receive module, a keyboard 1118. Not shown is some embodiments including a microprocessor system that controls the archival storage and display system 1107. The helmet further includes the heads up display system 1125 which may display images and data that are transmitted from the archival storage and display command module, an onboard data processor, or both. The connection enables initialization, data transfer and termination of the recordings as well as real time and or playback monitoring. As well as tamper detection if, for example, the device is opened.

Figure 12A:
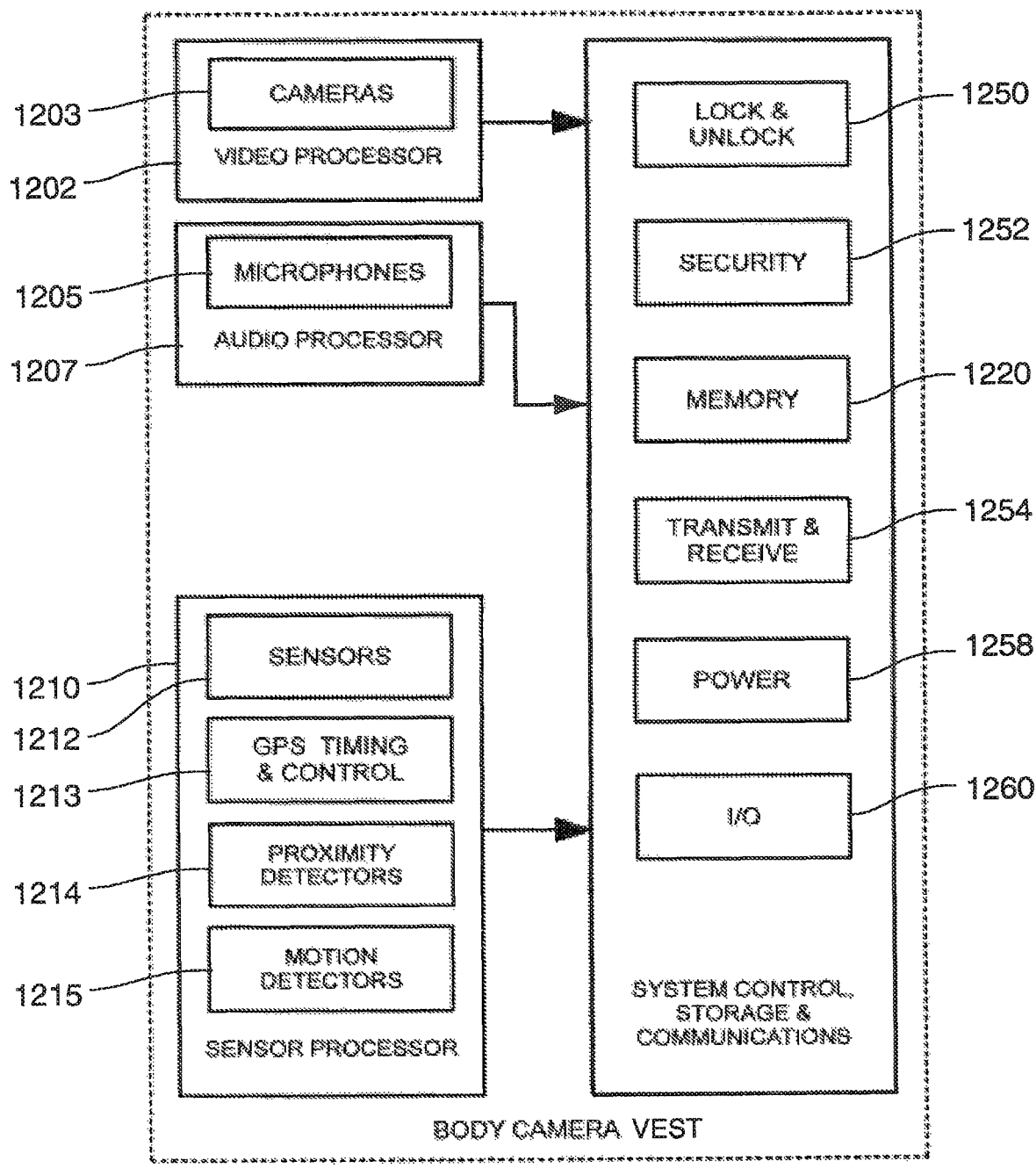
FIG. 12A is a block diagram of the body camera vest illustrating the components of the video, audio and sensor processors, and the flow of data from the cameras, microphones, and various sensors as indicated to the system control, storage & communications elements of the body camera vest, in accordance with some embodiments.

FIG. 12A is a block diagram entitled "Body Camera Vest" indicating the key processing, control, storage and communications elements of the device. which are further described herein. According to some embodiments, the body camera vest 1200 includes a plurality of cameras 1203 and a video processor 1202, a plurality of microphones 1205 and an audio processor 1207. The environmental sensor processor 1210 includes a plurality of sensors 1212, GPS timing and control circuitry 1213, a plurality of proximity detectors 1214, a plurality of motion detectors 1215. Input from these device is provided to the system control, storage and communications module 1201 which includes the locking function 1250, a security function 1252, an onboard memory 1220, transmitting and receiving module 1254, a power control and supply 1258 and an input and output interface for access and control of the system.

Figure 12B:
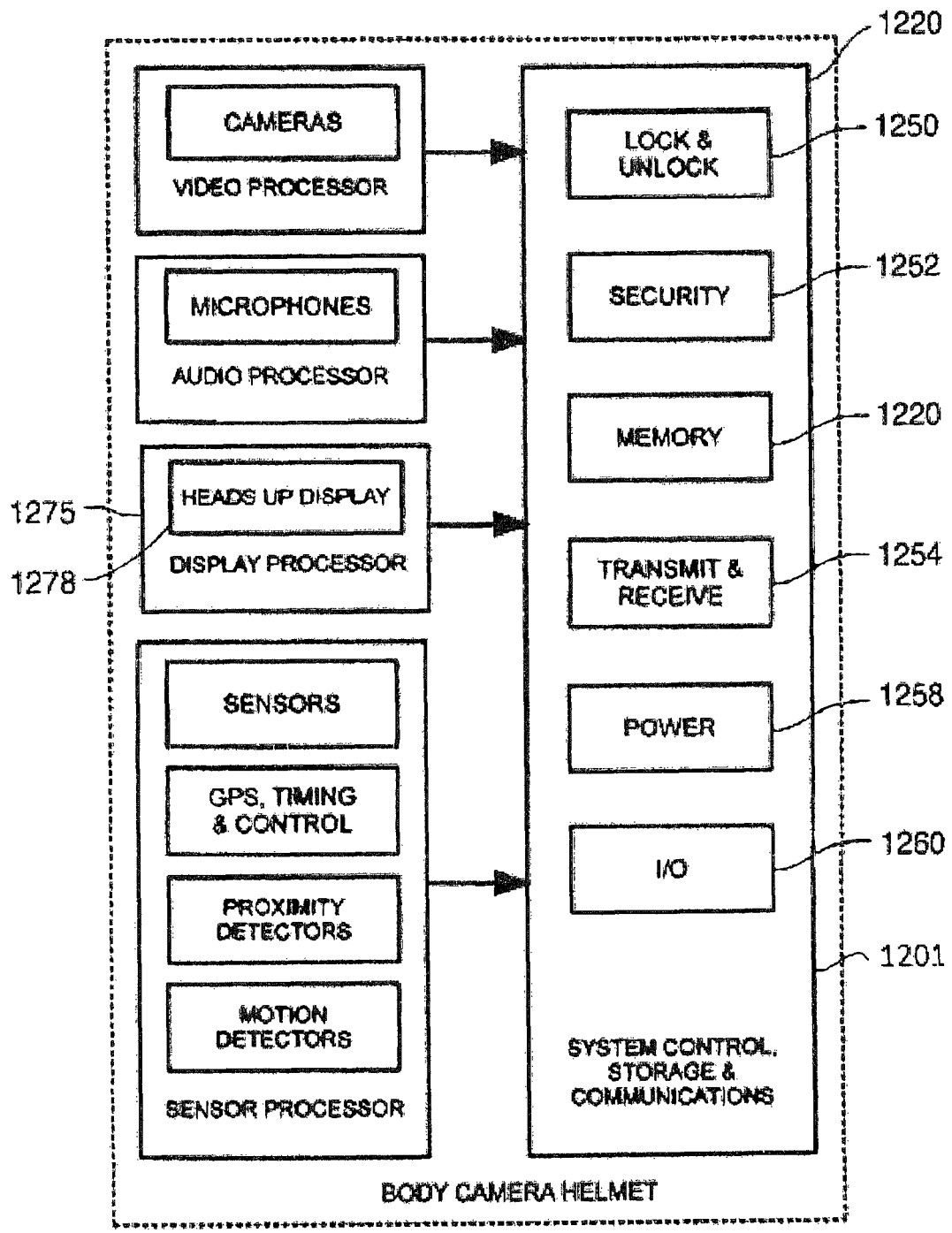
FIG. 12B is a block diagram of the body camera helmet illustrating the components of the display, video, audio and sensor processors, and the flow of data from the cameras, microphones, and sensors as indicated to the system control, storage and communications elements of the body camera helmet, in accordance with some embodiments.

FIG. 12B is a block diagram of the body camera helmet system, which has similar components as FIG. 12A, the body camera vest system embodiment, and further so includes the heads up display feature 1278 and associated heads up display processor 1275.

Figure 13A:
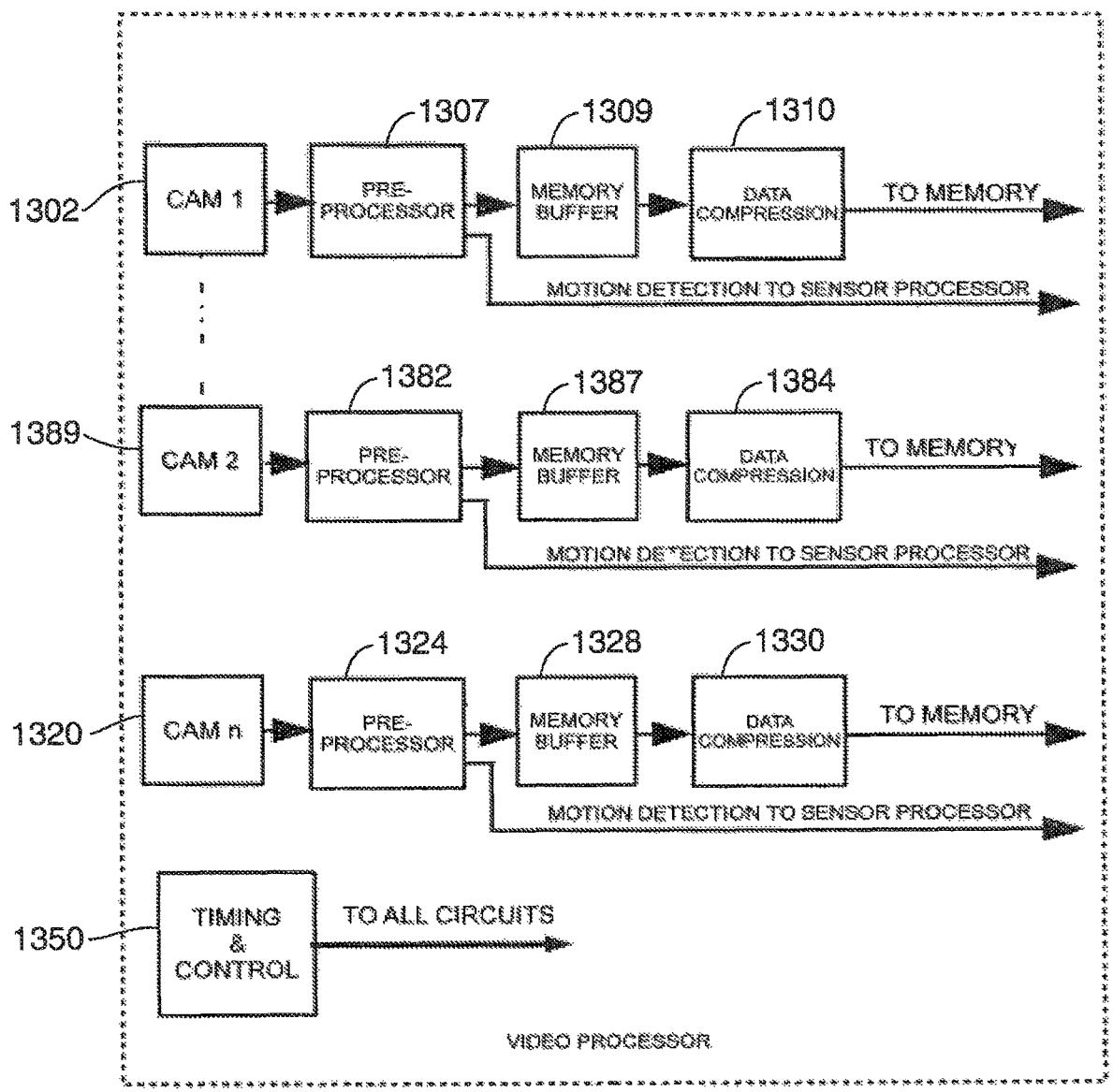
FIG. 13A is a block diagram of the video processor for the body camera vest system indicating the primary flow of the video data and motion detection data from the cameras to memory and the sensor processor, in accordance with some embodiments.
Figure 13B:
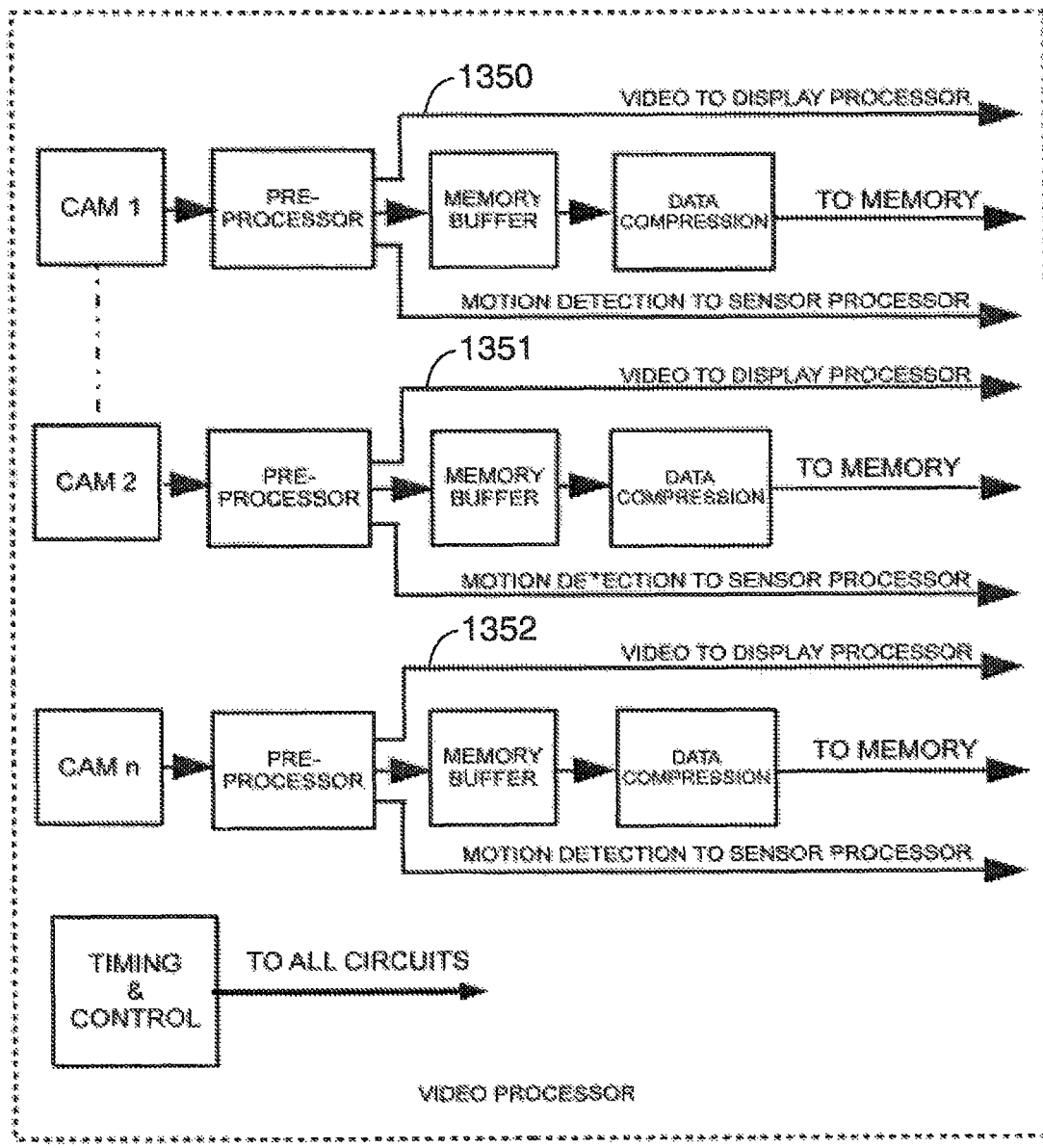
FIG. 13B block diagram of the video processor for the body camera helmet system indicating the primary flow of the video data, display data and motion detection from the cameras to memory, the display processor and the sensor processor in accordance with some embodiments.

FIG. 13A, a block diagram entitled "Video Processor" illustrates the primary flow of the video data from the plurality of cameras, cam 1 1302, cam 2 1389, through cam n 1320, where n is some number of cameras. According to some embodiments, video feed from camera 1302 connects to preprocessor 1307 and which outputs data to the motion detection processor (not shown) and into a memory buffer 1309. The data is then compressed 1310 and sent to storage in memory. This same sequence proceeds with the feed from cameras cam 2 1389 through cam n 1320, where n is some number of cameras. The timing and control module 1350 controls the process and provides a time stamp for the data. The processes for incoming video include providing autofocus, image stabilization, lighting control and various other camera related functions. Then the pre-processor detects motion or lack of motion, sends the resulting data from each camera to the sensor processor and also forwards the resulting data from each camera to a memory buffer which identifies and applies a time stamp to each frame of data. Then data compression is applied to the data from each memory buffer and is then sent to the memory. FIG. 13B depicts the video proceeding for the helmet embodiment similar to FIG. 13A that also includes the heads up display. The only difference in the video proceeding sequence is to provide the additional output feeds 1350, 1351, 1352 and any additional feeds from the preprocessors that is sent to the video display processor for the heads up display function.

Figure 14:
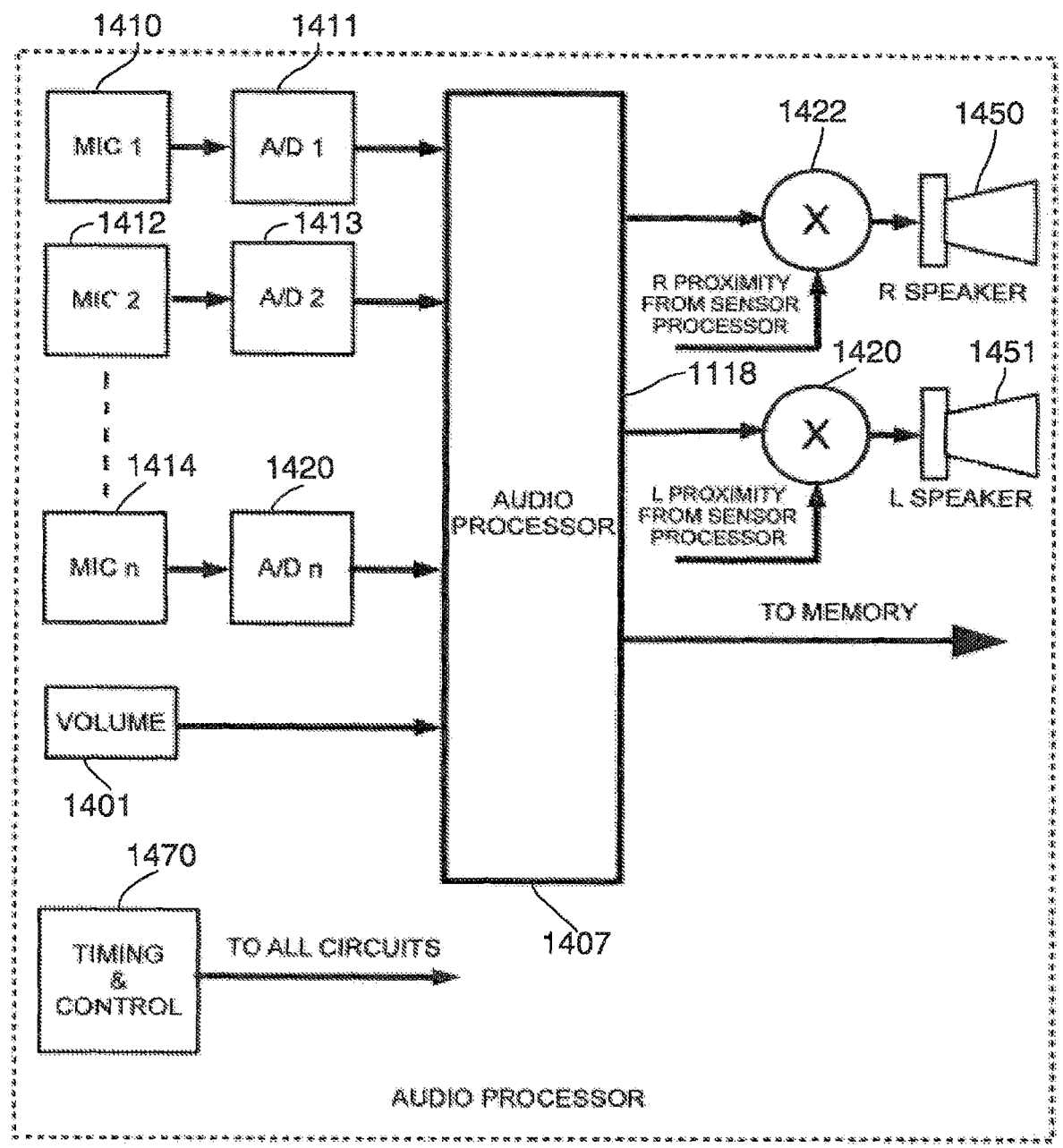
FIG. 14 is a block diagram that illustrates the flow of data from directional microphones to the audio processor, combined with data from proximity sensors and sent to the speakers and to memory, in accordance with some embodiments.

FIG. 14, a block diagram entitled "Audio Processor" depicts the flow of the audio data arriving at a plurality of directional microphones mic 1 1410, mic 2 1412 through mic n 1414, where n is some number of directional microphones. According to some embodiments, each audio signal from the Directional Microphones is converted from an analog signal to a digital signal by a plurality of appropriate A/D converters A/D 1 1411, A/D 2 1413, A/D n 1420 where n is some number of A/D converters which include the necessary band-pass filtering and sampling rate. An audio processor 1407 then applies Fast Fourier Transform (FFT) processing in order to correlate the various audio signals to determine the actual direction of the sound and applies this enhanced result to the left and right speaker/transducers 1450 and 1451 in proportion to the received direction and amplified according to the volume level 1401 set by the wearer of the system by means of a volume control or via a voice command. In addition to the tonal cues, prerecorded warning messages add additional awareness of events, such as, but not limited to rapidly approaching objects or vehicles, the direction of gunshots, such as for example "gunshots at 4 o'clock (the position). Proximity signals from a sensor processor (described elsewhere herein) are mixed with the outputs of the audio processor and the result is also sent to the left and right speaker/transducers and amplified according to the volume level set by the wearer of the system.

Figure 15:
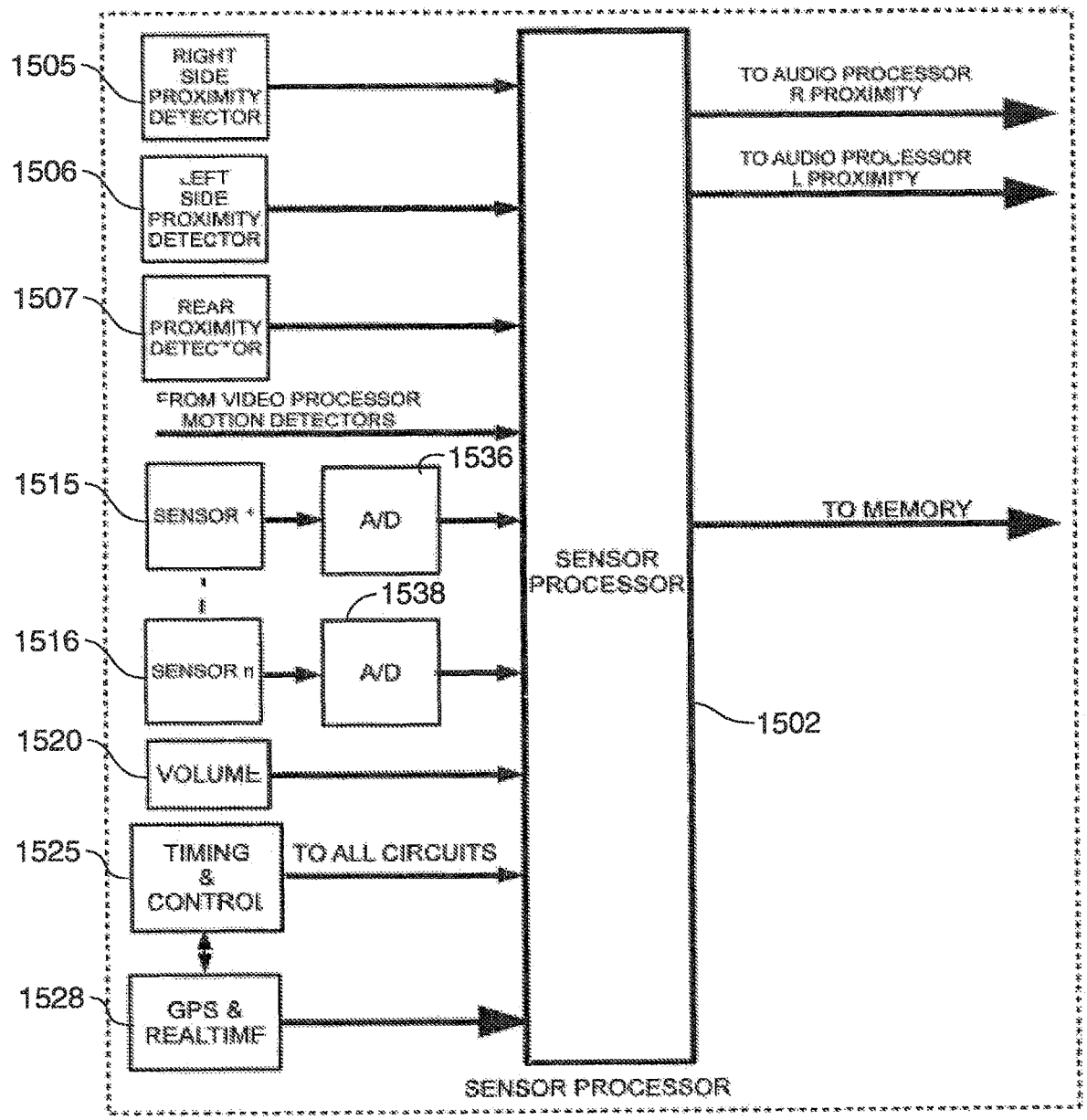
FIG. 15 is a block diagram that illustrates the flow of data from the various sensors, motion detectors and proximity detectors as well as global positioning system (GPS) data to establish location and time and sent to the audio processor and to memory, in accordance with some embodiments.

FIG. 15, a block diagram entitled "Sensor Processor" indicates the flow of data from a plurality of environmental proximity sensors 1505, 1506 and 1507 and a plurality of other sensors detectors 1515 through 1516 as well as global positioning system (GPS) data 1528 to establish location and real time with timing and control module 1525. According to some embodiments, right side detector 1505, left side detector 1506 and rear proximity sensors 1507 detect proximity and motion of persons and any other objects surrounding the user of the system which is combined with the motion detection data from the video processor. The sensor processor 1502, by means of FFT processing and other signal processing then produces audible signals which vary in loudness and frequency depending upon the speed, size, velocity, rate of closure and distance of the persons or objects in motion and mixes these resulting outputs from the sensor processor with outputs from the audio processor and sends the resultant signal to the left and right speakers. All of the data captured is also recorded in the memory. This gives the wearer of the system an ability as if they had "eyes in back of their head" and or the ability to become cognizant of objects beyond the normal range of vision of the wearer of the system. According to some embodiments, the presence of a person in proximity may be detected by a passive infrared sensor, which works on heat movement detection. These sensors use a pyroelectric sensor calibrated to detect infrared radiation radiated by human body movement. Alternatively video, Lidar, Lidar Fusion, millimeter wave radar or other proximity and or ranging methods may be incorporated to provide the proximity function.

According to some embodiments, other sensor signals from n sensors 1515 through 1516 are converted from an analog signal to a digital signal by an appropriate A/D converters 1536 through 1538 with the necessary band-pass filtering and sampling rate and processed by the sensor processor 1502. Such sensors within the systems include but are not limited in design to provide evidence of tampering, if any were to occur. Simple on/off signals, such as the tamper monitoring sensors are also processed by the sensor processor 1502. GPS and real time data are also incorporated and all sensor processor outputs are sent to the non-volatile memory shown 1114 in FIG. 11, A&B and 1611 in FIG. 16. For example, if the container enclosing the system is opened without authorization, a switch in sensor 1515 is activated and a signal is sent to the remote command and control center reporting the unauthorized access. System timing and control 1525 is synchronized with the real time clock 1528.

Figure 16:
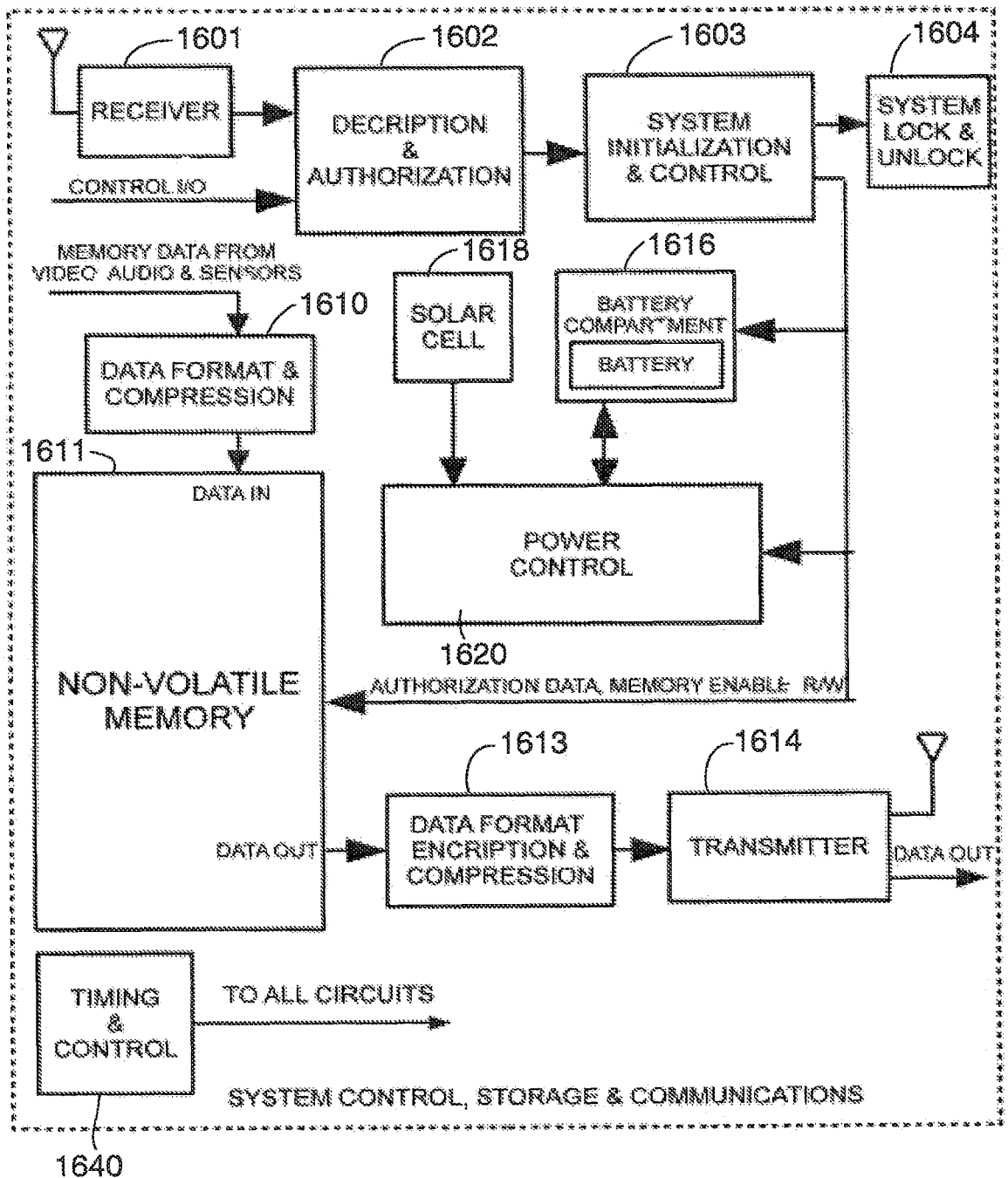
FIG. 16 is a block diagram illustrating the transmit/encryption, receive/decryption, system initialization, data format & compression, power control, security and memory functions, in accordance with some embodiments.

FIG. 16 is a block diagram entitled "System Control, Storage & Communications" and illustrates various system functions, and shows one of many possible methods to implement these functions. According to some embodiments, the system initialization can be accomplished via an input signal to the receiver 1601 or by direct connection when the system is co-located with the archival storage and display component of the invention. Security of received data is provided by the Decryption & Authorization Module 1602 for required decryption of the received data and authorization data that identifies the authorized person and the wearer of the system and then enables initialization of the system to commence recording via the System Initialization & Control Module 1603. A fully charged battery is inserted into the battery compartment 1616, the battery and the electronic control module compartments are then locked by means of the System Lock & Unlock function 1604. In some embodiments the battery could be a solid state battery The memory is reset and recording commences data is formatted and compressed at 1610 and directed to the non-volatile memory 1611. The memory receives all data from the video processor, audio processor and sensor processor as well as the authorization data that identifies the authorized person that initialized the system as well as identifying the wearer. GPS and timing data 1640 is also recorded to preserve, identify and authenticate when and where the recording is made at all times. Appropriate timing and control signals 1640 are applied to the system as required. Data formatting, encryption and compression are also applied 1613. Transmitter 1614 sends a stream of the data to authorized receiving locations as it is being recorded. Later, when the recording is to be terminated the system is again connected to the archival storage and display of FIG. 17. Termination can be accomplished via input signal to the receiver or by direct connection when the system is co-located with the archival storage and display. Security features require encryption and decryption of all transmissions to and from the body camera system.

According to some embodiments, data output formatting includes encryption and further data compression to reduce the bandwidth of data transmission. The data output is then transmitted to the archival storage and display system via the transmitter or by direct connection when the system is co-located with the archival storage and display system. Once the transmission of all recorded data has been completed and confirmed, the system can be unlocked and reset for the next usage. The solar cells and antennas are not shown on the drawings, but, in embodiments, are present on the exterior surface of the vest or helmet device as well as heat sinking/dissipating devices. The archival storage and display system and or other authorized display devices can remotely record and or display real time data even while the system is still recording or alternately play back previously recorded data.

Figure 17:
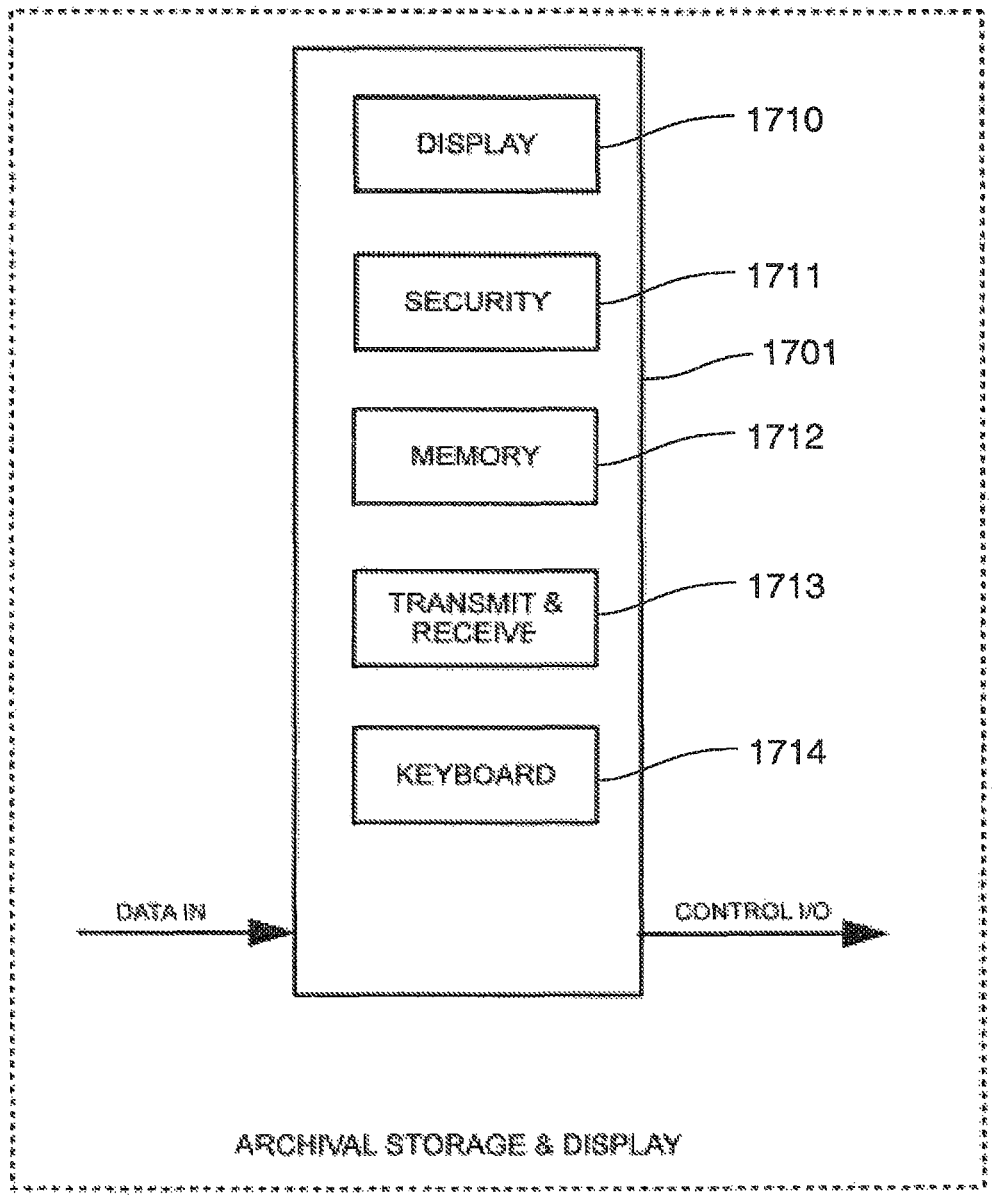
FIG. 17 is a schematic diagram illustrating the key elements that will typically interface with one or more body camera vests, body camera helmets, shoulder mounted cameras or other embodiments, in accordance with some embodiments.

Now referring to FIG. 17, the archival storage and display system as described above initializes recording and terminates recording by the body camera system. According to some embodiments, security features 1711 allow only authorized personnel to operate the system and internal controls require confirmation of complete archiving of the data recorded by the system prior to terminating the recording. The storage system includes keyboard 1714, the transmit and receive module 1713, a memory 1712 and a display 1710, additional standard supporting computing circuitry such as a laptop or desktop computer is not shown. Authorized personnel may also monitor real time and or playback recordings from the portable body camera and sensor system as well as from archives. More than one portable camera and sensor system can be controlled and monitored by the archival storage and display system simultaneously. Additional parameters can be incorporated as options, such as, but not limited to ambient temperature sensors, body temperature sensor, heart rate monitors, vital signs and geolocation data or any other parameters. Data from these sensors can be recorded simultaneously with the video, audio and environmental sensor data and also reported to the central authority in some embodiments.

In addition to the video, directional microphones record audio coming from the same direction that each camera points. The sound received from the array of directional microphones is combined by means of FFT signal processing to determine the direction of the sound, such as a gunshot. The body camera vest or body camera helmet speakers, actually sound reproducing transducers, inform the wearer of the direction that the sound was originated by means of pre-recorded messages.

Infrared illumination, integral to the cameras, for night vision is engaged automatically when lighting conditions warrant it. The system sensors of the invention are intended to be weatherproof and waterproof and at least neutrally buoyant if not providing flotation. An alternate embodiment version of the body camera vest or helmet camera providing a three-dimensional view is possible by adding additional cameras and appropriate signal processing. In yet a further embodiment, the system is employed on a robotic device which is controlled from an external location and may include mounting the camera system and environmental sensors on a motorized vehicle or a drone. Optionally, a processor external to the system can combine the video data into a seamless 360-degree panoramic view or alternately, this data processing is accomplished by a processor internal to the body camera system. According to some embodiments, protection against electro-magnetic pulse (EMP), static electricity, lightning discharge and any other disturbance that can disrupt or prevent normal operation or even permanently destroy the portable body camera and sensor system may be incorporated.

According to some embodiments, the system incorporates protective penetration resistant body armor material within the structure of the vest itself such as, but not limited to Kevlar in order to enhance the safety of the wearer. Any one of several lightweight, flexible materials, including but not limited to neoprene, silicone, synthetic fabrics, cotton, rubber or plastic can form the structural shell of the camera. Some embodiments may incorporate the use of Graphene and or Carbyne for the Enclosures and Bullet Proofing as opposed to Kevlar. Not shown, but included in the design of the vest embodiment are ventilation openings, securing devices such as straps, belts or hook and loop fasteners. According to some embodiments, solar cells that are conformed to the surface of the vest are provided as well as wireless power to provide supplemental power during operation.

Metal may be shaped to conform to the surface of the vest to achieve the protections shown in above as well as for dissipation of heat from the electronic control module and for antennas required by the transmitter and receiver, in embodiment not shown but may be provided on the exterior surface of the vest. The placement and quantity of all cameras, microphones, sensors and all else that is a part of the vest can be implemented in a plurality of ways and is only shown in one of the many possible configurations in order to demonstrate the feasibility of the invention. For example, in embodiment the shoulder compartment can include forward, sideward, upward and rearward facing cameras. In further embodiments, the sensors, controls and all other devices necessary for operation of the body camera vest or helmet are incorporated into the design of the structure itself. Optionally, some of the control components may be affixed to a waist belt, wrist or other means of retention to the wearer.

According to some embodiments, a log is maintained of all recordings, when and by whom recordings are viewed, erased and/or transferred from the system. Erasure is only possible after successful transfer of all data has been confirmed and then only by an authorized person. Operation of the system can be performed automatically and hands free to the wearer, including volume controls for proximity detection and audio. In connection with the body camera vest or helmet, provisions are made in order to attach badges, signage and or accessories to the device. As an alternate configuration, additional cameras can be added in order to achieve three-dimensional video as well as enhanced distance evaluation.

FIG. 11A is a block diagram of the body camera vest system depicting the interface between the elements of the body camera vest depicted in FIG. 12A and the archival storage and display elements depicted in FIG. 17. According to some embodiments, connection between the body camera vest elements and the remote archival storage is made either via a wireless transmitter and receiver or through a direct link to the archival storage and display system. According to some embodiments, the connection enables initialization and termination of the recordings as well as real time and or playback monitoring.

FIG. 11B is a block diagram of the body camera helmet system depicting the interface between the elements of the body camera helmet depicted in FIG. 12B and the archival storage and display elements depicted in FIG. 17. According to some embodiments, connection between the body camera helmet elements and the remote archival storage is made either via a wireless transmitters and receiver or through a direct link to a separate archival storage and display system. According to some embodiments, the connection enables initialization and termination of the recordings as well as real time and or playback monitoring.

In applications where the camera system is used for law enforcement work, there has sometimes been problems where the user may turn off the camera and a complete record of an event may not be captured. In some cases, the need for privacy is appropriate such as using rest room facilities or in connection with personal conversations or circumstances. According to some embodiments, it is desirable to have the camera controlled from a remote locations and by an administrator. When a wearer requests privacy, they can request the administrator turn-off the camera from a central administration location. According to some embodiments, as soon as their GPS position changes, the camera and audio recording feature is automatically turned back on. In addition, the GPS location of the user can be checked to verify proper usage. Other than recognized exceptions, the camera is always on, from the time it becomes worn and logged in by an administrator until it is removed with the authorization of the administrator.

According to some embodiments, live data is constantly streamed back to a central server, and to a local computer which may be provided in a police vehicle when available. The current and future capacities of high density secure data cards and derivatives of such memory cards allow high definition recording for 24 hours or more, with various forms of data compression. As real-time data is transferred, the system responds by confirming that the data has been received successfully, a check-sum can be replied for this purpose. In the event that additional data storage beyond capacity is necessary, the oldest data (first in/first out) may be overwritten provided that there was not a reportable event in that time interval, where any need for overwriting is likely to be on data from many hours prior to that time. The administrator can mark events as important for preservation and an archival system can retain any or all data from each system.

The system is designed to be tamper resistant and attempts to open and access the data recorded therein must be preceded by an administrative code to allow for access. Tamper resistant switches report attempts to open and/or remove the camera to the administrator. Access to redundant batteries and all memory devices is protected by the tamper proof enclosure, short circuit protection and overvoltage protection, and an alarm is sent to the Administrator. Further, a watchdog timer is constantly monitoring system performance and can reset (or request a reset) when appropriate.

Various safeguards for radio frequency interference (RFI), electro-magnetic interference (EMI) and other protective circuitry are incorporated within the design to inhibit or prevent damage to the workings of the body camera and sensor system, whether of accidental or deliberate causation. According to some embodiments, a global positioning system (GPS) and a time synchronization code from the National Bureau of Standards, Radio Station WWV (if necessary) can be further incorporated to insure accurate time stamping of archival data.

As discussed above, a shoulder mounted embodiment with forward, rear, lateral and vertical cameras, directional microphones and sensors can provide a "360 degree hemispheric dome of awareness" and will record video, audio, approaching objects and even direction of gunfire, if present. According to some embodiments, the integral mechanical mounting of the cameras, microphones and sensors, wherein minimal hardware is exposed though the body camera vest or helmet has durability and reliability advantages over the clip-on cameras and systems utilized by first generation body cameras.

By utilizing at least two cameras oriented in a general single direction, the redundancy achieved would make defeat of the recording unlikely. Further, the ability to cover and impeded the use of any exposed sensor (by either the wearer or the observed) would be difficult when more than one sensor is used. Further, in the event that the sensor was impeded, repeating "blank" frames" would be immediately reported to the administrator for review and query to the wearer. Further, cylindrical or hemispheric panoramic views can be reconstructed from the multiple camera recordings. The dual camera configuration would also allow for three dimensional (3D) views.

According to some embodiments, the wearer's communication device/radio transceiver can be integrated within the device in order to facilitate communications with the administrator. When there is no activity, or when activity of the wearer is reduced, such as the camera looking upward to the roof of the wearers vehicle for example, and in circumstances where there may be redundant camera feeds (such as external to a police car) the resolution of the body camera can be reduced to further compress the recorded data, but recording can be restored to full resolution as soon as the environment warrants it—such as a prompt from video, audio or other sensors which may be automatic, triggered by the wearer or from an administrator.

The video, audio and sensor processors may be incorporated within field programmable gate arrays (FPGA) and/or application specific integrated circuits (ASIC) devices. Analog to digital (A/D) converters, digital to analog converters (D/A), memory devices, cameras, directional microphones, proximity detectors, speakers, transducers, batteries, solar cells, global positioning system (GPS) devices, transmitting, receiving, encryption, decryption and security devices and any other supporting elements are all to be incorporated within the system. In addition to image processing software and/or firmware, the system uses other camera related video processing circuitry for auto-focus, exposure control, image stabilization, time and position of each image as reported by GPS, compression of video, data buffering, extraction of motion detection with hand-off to the sensor processor and any other data enhancement methods. Video and all other data is transferred to and saved in the non-volatile memory devices as well as transmitted to remote destinations as it occurs.

A number of alternative image sensors may be used in connection with the camera function. In an embodiment, the cameras selected are the AR0237 Manufactured by ON Semiconductor which is a 2 Megapixel 0.37" CMOS Digital Image Sensor with an active-pixel array of 1928(H)×1088 (V), full HD at up to 60 frames per second. An optical lens is also utilized by this camera. An electronic or mechanical shutter mechanism may be incorporated.

Audio processing begins with audio received by the various directional microphones, which are then processed by A/D Converters, along with required analog and digital anti-aliasing filtering. The audio processor can then combine the audio and transfer the result to the non-volatile memory devices. The time of receipt of the audio signals, and in particular while functioning as gunshot detection sensors, time of receipt and magnitude of the acoustic wave front at each directional microphone is compared to determine the magnitude and direction of origin and then paired with the corresponding video. Signals such as gunshots are determined by digital correlation techniques and an audible report is conveyed to the wearer via speakers/transducers that are part of the system. The audio and image sensor processors provides proximity information to be heard by the wearer on the speakers/transducers.

According to some embodiments, an audible report is provided in the form of a tone which increases in intensity and/or frequency as the approaching object gets closer and/or denoting the size of the approaching object. According to some embodiments, an audible notification report is a pre-recorded text. The impulsive audio detections, when regarded as gunshots, produce an audible report which will be, for example: "shot heard from 5 o'clock", indicating the angle of approach with respect to the direction that the wearer of the system is facing when the gunshot was detected.

The protective features of this improved camera and sensor system is designed to alert the wearer of potential threats beyond the normal range of vision and enhances the life-saving capabilities that are lacking in existing systems. The systems may be integrated within a protective vest, which will make the system components more durable and retentive than simple "clip-on" prior art cameras that are currently manufactured and in use worldwide. According to some embodiments, when shoulder mounted, a retentive strap and the mechanical design of the enclosure will insure the retentive ability of the camera system, as well as the redundancy provided by utilizing two shoulder mounted cameras, one on each shoulder.

According to some embodiments, an additional feature of the helmet mounted body camera is that an optional Heads Up Display Visor 626 on FIG. 7, can be affixed to the Helmet to truly provide an "eyes behind their head" capability. Proximity Sensors emit an ultrasonic, audio or radio frequency, laser, LIDAR, microwave, radar or sonar impulsive signal. Processing begins with Sensor data received by the various sensors, which are then processed by A/D converters or other signal processing circuitry, along with required analog and digital anti-aliasing filtering as well as the various proximity detectors. Time of receipt of the wave front at each proximity sensor is processed by the sensor processor, calculating time, distance, magnitude of the returning signal and rate of approach, and in conjunction with the audio processor, which also provide proximity information to the speakers/transducers. The audible report may be a tone which increases in volume intensity and/or frequency as the approaching object gets closer and/or denoting the size and rate of approach of the object. The audible notification report may also be by means of pre-recorded text.

The audible volume is controlled by the voice of the wearer by commanding "increase volume" or "decrease volume" heard or sent which will be detected by the speakers/transducers and or microphones of the system that are attached or integrated to the body camera vest, helmet or shoulder mounted device or other remote camera and sensor device, such as for hemispherical or cylindrical screen projection, zoom, special work break, bathroom break, replay event, communicate, zoom. Additional audible commands may be incorporated into the device as usage dictates. Noise cancelling techniques may be incorporated to enhance clarity.

According to some embodiments, Fast Fourier transform (FFT) processing is one method of detecting the angle of approach of a particular waveform, such as a gunshot. Each sensor receives the waveform at a slightly different time and thus the angle of approach can be determined. Common functions in many applications that utilize signal processing are FFT, autocorrelation, cross-correlation and frequency bin selection are now utilized in the processing of the camera and sensor signals audio, video and other waveform signals that are sensed.

According to some embodiments, system control, storage and communications functions FIG. 16, are also incorporated within the body camera and sensor system. A possible exception is the placement of an auxiliary battery to extend operational time in situations where this is deemed necessary. In yet a further embodiment of the invention, the surface of the vest helmet or other device contains solar cells to enhance battery performance. According to some embodiments, the internal battery (or batteries) will always be kept in a charged state such that removal of the auxiliary battery will not affect operation for hours and all power management is reported to a central and external authorization center which monitors operation and can communicate with the wearer at any time. According to some embodiments, wireless power supplements the battery power to extend the operational time. According to some embodiments, The body camera is protected against any attempt to destroy it by means of access via the external battery wiring, short circuit and overvoltage protection is incorporated as well as EMP protection at all external interfaces such as the antenna and the computer interface.

According to some embodiments, transmission and reception of all data and communication signals are by encrypted and decrypted streams of data containing check-sum generation and/or verification to ensure accurate transfer of data, sent via various radio frequency (RF) methods, including but not limited to Wi-Fi (commonly meaning Wireless Local Area Network, WLAN), 4G, 5G, millimeter wave, satellite or other means of transmission. An antenna (with diplexer, if necessary) is included within the enclosure of components of the system.

According to some embodiments, an authorization center control system which monitors operation of the body camera system can communicate with the wearer at any time, can initialize operation of the system, authorize the removal of the system by the wearer and can terminate usage after insuring that all data has been archived, as well as control the locking and unlocking of the camera system components in order to change or remove batteries and memory cards.

According to some embodiments, the archival storage and display system FIG. 17 remotely interfaces with the various body cameras operating at that time for their particular administration. This system is the source of monitoring and communications, both digitally and audibly, and the system controls the operation, the locking and/or unlocking of the camera and sensor enclosure, it detects any tampering, and verifies the archival storage of all data. Encryption and decryption as well as check-sum generation and/or verification ensure accurate transfer of data. A laptop computer can be configured to act as a local archival storage and display system, or an archival storage and display system may be located at a central control location. The cameras may have a direct wired connection to the archival system or interfaced using a wireless connection.

Most of the command and control functions that coordinate operation of the camera is hardware based in order to maximize the speed of response, however, where necessary firmware and software are also incorporated. According to some embodiments, the camera is integrated with head gear, such as a protective helmet or other form of head gear that has multiple cameras, microphones and sensors associated or integrated to the helmet that can record up to a 360-degree view as well as a skyward looking view. The skyward or upward facing cameras are depicted in FIG. 5 at reference numeral 138 and at FIG. 6 through FIG. 9 at reference numeral 658.

According to some embodiments, this invention creates a body camera configuration whose intended functions are difficult to defeat, either by force of an attacker or by tampering, a body camera with potentially life-saving features that enhances the safety of the wearer, often a police officer by alerting the wearer of approaching persons or objects from beyond their normal field of view, by integrating the body camera within, for examples, a vest, a helmet in order to greatly reduce the chance of removal. As used herein the term body camera can mean cameras worn on a person's body, including on the head, vest or shoulders, and combinations thereof.

As discussed above, according to some embodiments, system components include both proximity detectors and motion detectors. The detection of moving objects from camera vision source usually involves a scene that has been captured by stationary cameras. According to some embodiments, the camera may be subjected to a person or vehicle's movement, which results in ego-motions on the background. This results in mixed motion in the scene, and makes it difficult to distinguish between the target objects and background motions. Without further processing treatments on the mixed motion, traditional fixed-viewpoint object detection methods can lead to many false-positive detection results.

According to some embodiments, the present system employs signal processing algorithms that have been traditionally been used for automobile Backup Collision Intervention (BCI), which informs drivers of obstacles behind the vehicle by giving visual, aural, or tactile feedback. This technology has utilized laser, ultrasonic, microwave radar, and vision sensors to measure the distance from the vehicle to obstacles. Although they differ by specific application, vehicle on-board sensors work as the main components for the system and may function independently or in conjunction with others. Processing techniques using the video camera feeds can provide more features such as moving object detection.

Vision-based moving object detection is a major area of research and development in the computer vision arena, and there are a large number of approaches. However, many of the processing algorithms assume a stationary viewpoint. See Zhan C., Duan X., Xu S., Song Z., Luo M. An improved moving object detection algorithm based on frame difference and edge detection; Proceedings of the Fourth International Conference on Image and Graphics; Chengdu, China. 22-24 Aug. 2007; McFarlane N. J. B., Schofield C. P. Segmentation and tracking of piglets in images. Mach. Vis. Appl. 1995; 8:187-193. doi: 10.1007/BF01215814.

Because the individual wearing the body camera helmet or vest system will be moving, and because the movement introduced to its vision source is also reflected on the background of the taken scene, without proper distinction, the mixed motion between the background and foreground object is hard to separate out. Since the present application includes a vision-based system mounted on an individual movement of the viewpoint is inevitable. Therefore, compensation must be first made for the background movement, called ego-motion, for later processing using the traditional object detection methods.

While the block diagrams and descriptions indicate a particular embodiment, there are many methods that will accomplish the intended functions and advances in the functionality of elements within the body camera and the configuration itself. The body cameras may also incorporate automatic facial recognition and identification reporting of persons viewed and or Automatic license plate reading and reporting to increase the overall awareness of the body camera wearer in some embodiments. Sensors detect and report the speed and size of approaching objects and the tones vary in frequency and volume to increase situational awareness.

While such compensation in signal processing algorithms is possible because of the unique characteristics of the slow-moving back-up movement, which introduces mild motions across the scene, the present circumstances when an individual is ambulatory or running, the compensation is a more complex exercise. The uniform vectors found all over the frame are first extracted, and based on those vectors, a rough compensation of the background is made. The actual object detection routine is then performed using the difference between a frame and the compensated background frame at the time. According to some embodiments, if front camera video is blank, especially during motion of the wearer aside from motion of, for example, a vehicle, the body camera will send an alert to the central authority, however some cameras can be blank if seated or during circumstances that would normally block a view.

According to some embodiments, the processing steps of the present invention use a background subtraction technique for this signal processing exercise. Background subtraction describes a method of separating moving foreground objects from stationary background images. Background subtraction has been applied to motion detection on vehicles and use algorithms in combination with more such as simple frame difference subtraction techniques between two consequent images. For example, the processing technique uses statistic models to extract backgrounds from moving viewpoints. See Huang S C, Chen B H, Highly accurate moving object detection in variable bit rate video-based traffic monitoring systems, IEEE Trans Neural Netw Learn Syst. 2013 December; 24(12):1920-31. Further examples are disclosed by Huang S. C., Chen B. H. Automatic moving object extraction through a real-world variable-bandwidth network for traffic monitoring systems, IEEE Trans. Ind. Electron. 2013; 61:2099-2112. doi: 10.1109/TIE.2013.2262764 and Cheng F. C., Huang S. C., Chen B. H, A hybrid background subtraction method with background and foreground candidates detection. ACM Trans. Intell. Syst. Technol. 2015; 7:1-14. doi: 10.1145/2746409.

Alternatively, neural networks or outlier detection models are used in the data processing step. See Zhou X, Yang C, Yu W, Moving Object Detection by Detecting Contiguous Outliers in the Low-Rank Representation, IEEE Trans Pattern Anal Mach Intell. 2013 March; 35(3):597-610; Huang S C, Do B H, Radial Basis Function Based Neural Network for Motion Detection in Dynamic Scenes, IEEE Trans Cybern. 2014 January; 44(1):114-25. These subtraction models can be further categorized into a number of groups according to their main characteristics. See also, Bouwmans T, Traditional and recent approaches in background modeling for foreground detection: An overview. Comput. Sci. Rev. 2014; 11-12:31-66. doi: 10.1016/j.cosrev.2014.04.001. See also Mikael Thalen Researchers 'See Through Walls' Using WiFi & AI, Infowars.com Jun. 13, 2018.

According to some embodiments, further data processing technique that can be used to separate background from moving objects is referred to as "optical flow." Optical flow refers to the motion of apparent movement of brightness patterns in an image, making it sensitive to light sources. Others have combined background subtraction and optical flow methods simultaneously.

It will be clear to one skilled in the art that the embodiments described above can be altered in many ways without departing from the spirit and scope of the invention. Accordingly, the scope of the invention should be determined by the following aspects and their legal equivalents.

According to some embodiments, a multiview body camera vest system is disclosed. The system includes a vest member as shown in FIGS. 1 through 5, 11A,12A, 13A, 14 through 17, a first plurality of camera units mounted on the front, back, sides and upwards of the vest member providing video for real time monitoring, sensing and direction finding of surroundings of a wearer of the vest member, a second plurality of directional microphones mounted on the vest member providing audio for real time recording and direction finding, a third plurality of sensors mounted on the vest member direction finding, time & location determination, proximity detection and other parameters described herein, a control module for controlling the first plurality of camera units, the second plurality of microphones and the third plurality of sensors, a battery, batteries, solar cells and or wireless power for powering the body camera vest of FIG. 12A. According to some embodiments, the tamper-proof locking compartment is operated by a control signal transmitted from an authorized party located at a remote location or a security code, the vest member is configured to mount the first plurality of camera units, the second plurality of directional microphones, the third plurality of sensors, the battery and the tamper-proof locking compartment. According to some embodiments, at least one of the third plurality of sensors is a proximity sensor. According to some embodiments, the vest member is bullet proof. According to some embodiments, the multiview body camera system further includes at least a heating member and insulating panel for maintaining body temperature of the wearer of the vest member. According to some embodiments, the control signal transmitted from the authorized party located at the remote location is transmitted wirelessly or by direct connection to the archival storage and display system of FIG. 17. According to some embodiments, the control signal transmitted from the authorized party located at the remote location is transmitted via a cellular network or by 4G, 5G, millimeter wave or WiGig. According to some embodiments, the multiview body camera system further includes or is contained within one or more shoulder pads. According to some embodiments, the system control, storage & communications functions shown in FIG. 16 (also referred to as the control module) further comprises data storage units, a non-volatile memory for storing video, audio and sensor data received from the first plurality of camera units, the second plurality of directional microphones and the third plurality of sensors. According to some embodiments, the control module further comprises real time data transmission units for transmitting real time data received from the first plurality of camera units, the second plurality of microphones and the third plurality of sensors to the remote location. According to some embodiments, the control module receives data and communications from the remote location. According to some embodiments, the control module further performs encryption, decryption, system initialization, data formatting & compression, power control, security functions and timing & control.

According to some embodiments, a multiview body camera helmet system is disclosed. The helmet system includes a helmet member as shown in FIGS. 6 through 10, 11B,12B, 13B, 14 through 17, a first plurality of camera units mounted on the top, front, back and sides of the helmet member providing video for real time monitoring of, sensing and direction finding of surroundings of a wearer of the helmet member, a second plurality of directional microphones mounted on the helmet member providing audio for real time recording and direction finding, a third plurality of sensors mounted on the helmet member for direction finding, time & location determination, proximity detection and other parameters described herein, a control module for controlling the first plurality of camera units, the second plurality of microphones and the third plurality of sensors, a battery, batteries, solar cells and or wireless power for powering the body camera helmet of FIG. 12B. According to some embodiments, the tamper-proof locking compartment is operated by a control signal transmitted from an authorized party located at a remote location. According to some embodiments, the tamper-proof locking compartment is operated by a security code. According to some embodiments, at least one of the third plurality of sensors is a proximity sensor. According to some embodiments, the helmet member is bullet proof. According to some embodiments, the multiview body camera system further includes at least a heating member and insulating panel for maintaining body temperature of the wearer of the helmet member. According to some embodiments, the data, voice and control signals are transmitted by the authorized party located at the remote location wirelessly, or by direct connection of the archival storage and display system of FIG. 17. According to some embodiments, transmissions from the authorized party located at the remote location are transmitted via a cellular network or by 5G, millimeter wave or WiGig. According to some embodiments, the system control, storage & communications functions shown in FIG. 16 (also referred to as the control module) further comprises data storage units, a non-volatile memory for storing video, audio and sensor data received from the first plurality of camera units, the second plurality of directional microphones and the third plurality of sensors. According to some embodiments, the control module further comprises real time data transmission units for transmitting real time data received from the first plurality of camera units, the second plurality of microphones and the third plurality of sensors to the remote location. According to some embodiments, the control module receives data and communications from the remote location. According to some embodiments, the control module further performs encryption, decryption, system initialization, data formatting & compression, power control, security functions and timing & control.

According to some embodiments, a control system is disclosed. The control system includes at least one vest-mounted multiview body camera for collecting real time audio-visual data, at least one helmet-mounted camera for collecting real time audio-visual data and a remote control unit for controlling the at least one vest-mounted multiview body camera and the at least one helmet-mounted camera, wherein the at least one vest-mounted multiview body camera and the at least one helmet-mounted camera are connected to the remote control unit wirelessly. According to some embodiments, the remote control unit further comprises a remote data storage unit for storing the real time audio-visual data collected by the at least one vest-mounted multiview body camera and the at least one helmet-mounted camera. According to some embodiments, the remote control unit further comprises a remote warning unit for providing at least one warning signal to a wearer of the vest and helmet based on an analysis of the real time audio-visual data received from the at least one vest-mounted multiview body camera and the at least one helmet-mounted camera.

Some embodiments may include Data Fusion of Radar and Video as well as other Sensors (not limited to but including microwave, ultrasonic, infrared, magnetic, GPS location, proximity to other persons or objects, or temperature, humidity, heart rate and other body functions) in order to provide a more comprehensive report of the situation at hand, as well as detection and alerting the wearer of a persons gesturing, a lifesaving feature when hostile behavior is detected. Other embodiments may apply Advanced Artificial Intelligence, Neural Networks, Machine Learning and Automatic checking of any and all Data Bases to enhance the knowledge and Situational Awareness of the wearer. Some embodiments may be capable of Automatic License Plate Recognition, Gesture Recognition and Facial Recognition, Voice Recognition of the wearer (to only accept commands from the wearer) as well as Situational Alerts that the Body Camera either determines itself from all or any of the data it is processing and or reports via connection to a Central Authority. This added knowledge can provide a further lifesaving edge to the wearer.

Some embodiments provide continuous recording up to and beyond 24 hours, data compression, as well as the inability for the device to be turned off, which insures that the Body Camera will record, capture and forward all events while worn (excluding the special "Bathroom Break" exception previously described having automatic restoration of recording as soon as the GPS coordinates of the wearer changes). The Body Camera will immediately notify the Central Authority if the device is Removed.

Other features of most embodiments may include radiation detection, observing through walls by various methods including WiFi Backscatter. The millimeter wave radar being used to sense speed, size and distance is agile and can be switched (verbally) to other useful modes, such as looking through walls, and can also be used to detect weapons, similar to what is done at airports. In some embodiments various sensors can add iris, palm and fingerprint scanning.

Some embodiment will be capable of Automatic License Plate Recognition, and when connected to various databases, will capable, for example, of driving through a line of parked cars, or viewing traffic, and identifying Make, Model, Color of the Vehicles, the Registered Owner, Outstanding Violations, Amber Alerts and other Data that is useful for Law Enforcement.

Some embodiments designed for military use may identify Country of Origin of Equipment, Uniform, Personnel, Weaponry, Speed, Vulnerabilities and other factors that will improve the abilities of the wearer as well as any other persons they are networked with. Some embodiments will include a translator capability for two way communications with persons using other languages. This could also be listening at all times to detect threatening speech that the wearer would otherwise not comprehend.

Some embodiments will employ facial recognition, enabled and enhanced by Artificial Intelligence to determine a person's intent, identify, outstanding warrants, mentally disability and other factors by computation and access to various databases. The AI itself can be Computationally Based, or based on Neural Network, Quantum Computing, and can also be used to analyze the radar return signal to develop dynamic models the surrounding area. These computing methods enable Deep Learning, Machine Learning, Assisted Reality, Virtual Reality, Cognitive Computing and Autonomic Computing in order to provide state of the art capabilities.

Some embodiments may incorporate sensors able to detect and report Hazardous Chemicals and Atmospheres.

Cybersecurity protocols may be used to prevent unauthorized access or interruption of operation and alert of attempted intrusions. In addition to the Notification of tampering to "Authorized" parties, some embodiments may enable either remotely or automatically a "Taser" like shock. A military version may even have self-destruct capability. GPS location data may be used such that mis-appropriated devices recovered.

Other embodiments may incorporate Phased Array Technology, which enables agile, near instantaneous steering of the Radar, 3-D detection and focusing of the Radar Beam to provide greatly increased power and ranging at a focused point. The array does not need to be planar, it can be conformal to the surface of the body camera.

Solid state batteries, energy harvesting and regeneration as well as One Wire Wireless power may be incorporated to supplement system power in some embodiments.

Although many of the aforementioned features exist none exist within a body camera.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. An enhanced situational awareness system comprising:
a vest member comprising a breast member and a back member;
at least one shoulder member removably connected to the breast member;

a helmet member comprising a transparent energized screen;

a plurality of environmental sensors interlinked via at least one control module for real time location, motion detection, proximity detection, internal temperature and moisture; and wherein a first portion of the plurality of environmental sensors and second portion of the plurality of environmental sensors are mounted on the vest member, a third portion of the plurality of environmental sensors is mounted on the helmet member, and a fourth portion of the plurality of environmental sensors is mounted on the at least one shoulder member and comprise a millimeter wave radar.

2. The enhanced situational awareness system of claim 1, further comprises a plurality of camera units, a speaker and a plurality of directional microphones, and wherein the breast member is are configured to house the first portion of the plurality of environmental sensors, a first portion of the plurality of camera units, and a first portion of the plurality of directional microphones and wherein the back member is configured to house the second portion of the plurality of environmental sensors, a second portion of the plurality of camera units, and a second portion of the plurality of directional microphones.

3. The enhanced situational awareness system of claim 2, wherein the helmet member is configured to further house a third portion of the plurality of camera units, and a third portion of the plurality of directional microphones.

4. The enhanced situational awareness system of claim 2, wherein the at least one shoulder member is configured to further house at least a fourth portion of the plurality of camera units, and at least a fourth portion of the plurality of directional microphones, directed forward, rearward, and upward.

5. The enhanced situational awareness system of claim 2, wherein the plurality of environmental sensors, the plurality of camera units, and the plurality of microphones are configured for overlapping coverage areas for redundancy, 3D imaging, and triangulation of noise sources and sensor returns.

6. The enhanced situational awareness system of claim 1, further comprising at least one tamper-proof locking compartment for hosting the at least one control module, a battery, and environmental controls.

* * * * *